United States Patent
Noguchi et al.

(10) Patent No.: US 8,361,433 B2
(45) Date of Patent: Jan. 29, 2013

(54) METHOD AND APPARATUS FOR MANUFACTURING HYDROGEN-CONTAINING GAS

(75) Inventors: Fuyuki Noguchi, Hyogo (JP); Naoki Inoue, Higashiosaka (JP); Kota Yokoyama, Amagasaki (JP)

(73) Assignee: Osaka Gas Co., Ltd., Osaka (JP)

( * ) Notice: Subject to any disclaimer, the term of this patent is extended or adjusted under 35 U.S.C. 154(b) by 980 days.

(21) Appl. No.: 11/922,032

(22) PCT Filed: Jun. 13, 2006

(86) PCT No.: PCT/JP2006/311783
§ 371 (c)(1),
(2), (4) Date: Mar. 25, 2009

(87) PCT Pub. No.: WO2006/134887
PCT Pub. Date: Dec. 21, 2006

(65) Prior Publication Data
US 2009/0212259 A1 Aug. 27, 2009

(30) Foreign Application Priority Data
Jun. 13, 2005 (JP) .................................. 2005-172456

(51) Int. Cl.
*C01B 3/26* (2006.01)
(52) U.S. Cl. .......... 423/652; 423/651; 423/653; 423/654
(58) Field of Classification Search .......... 423/650–654; 422/168–183
See application file for complete search history.

(56) References Cited

U.S. PATENT DOCUMENTS

| 5,883,138 | A | * | 3/1999 | Hershkowitz et al. | ......... | 518/703 |
|---|---|---|---|---|---|---|
| 5,935,489 | A | * | 8/1999 | Hershkowitz et al. | ......... | 252/373 |
| 5,980,596 | A |   | 11/1999 | Hershkowitz et al. |   |   |
| 5,980,782 | A | * | 11/1999 | Hershkowitz et al. | ......... | 252/373 |
| 6,123,913 | A | * | 9/2000 | Clawson et al. | ............. | 423/652 |
| 6,436,363 | B1 | * | 8/2002 | Hwang et al. | ................ | 423/651 |
| 6,887,286 | B1 |   | 5/2005 | Taki et al. |   |   |
| 6,921,516 | B2 |   | 7/2005 | Goebel et al. |   |   |

(Continued)

FOREIGN PATENT DOCUMENTS

| EP | 303438 A2 | 2/1989 |
|---|---|---|
| JP | 1145301 | 6/1989 |

(Continued)

*Primary Examiner* — Wayne Langel
(74) *Attorney, Agent, or Firm* — The Webb Law Firm

(57) ABSTRACT

There is provided a technique for manufacturing a hydrogen-containing gas. An oxygen-containing gas is mixed with a feed gas obtained by mixing steam with a hydrocarbon fuel, this mixture is introduced into a catalytic reaction chamber, and a partial oxidation reaction and a steam reforming reaction are conducted to obtain a hydrogen-containing gas. In this reforming, an antechamber of the catalytic reaction chamber is heated up to a self-ignition temperature in a first catalyst section, where the self-ignition temperature is the temperature at which a mixed gas self-ignites during the advection period required for the mixed gas to move from a mixing chamber to the catalytic reaction chamber, with this temperature being at least a minimum partial-oxidation temperature and lower than a minimum steam reforming temperature.

10 Claims, 11 Drawing Sheets

U.S. PATENT DOCUMENTS

| | | |
|---|---|---|
| 6,936,238 B2 * | 8/2005 | Sennoun et al. ............... 423/652 |
| 7,083,775 B2 * | 8/2006 | Wieland et al. ............... 423/652 |
| 2002/0058005 A1 * | 5/2002 | Aasberg-Petersen et al. ............... 423/418.2 |
| 2002/0172630 A1 * | 11/2002 | Ahmed et al. ............... 422/190 |
| 2003/0198592 A1 * | 10/2003 | Allison et al. ............... 423/651 |
| 2004/0039069 A1 | 2/2004 | Kiuchi et al. |
| 2004/0146458 A1 * | 7/2004 | Weissman et al. ............ 423/651 |
| 2006/0013762 A1 * | 1/2006 | Kuipers et al. ............... 423/651 |

FOREIGN PATENT DOCUMENTS

| | | |
|---|---|---|
| JP | 11092102 | 4/1999 |
| JP | 11335101 | 12/1999 |
| JP | 2002121007 | 4/2002 |
| JP | 2003201103 | 7/2003 |
| JP | 2003306311 | 10/2003 |
| WO | 0176731 A1 | 10/2001 |

* cited by examiner

METHOD AND APPARATUS FOR MANUFACTURING HYDROGEN-CONTAINING GAS

BACKGROUND OF THE INVENTION

1. Technical Field

The present invention relates to a method for manufacturing a hydrogen-containing gas, comprising a mixing step of mixing, in a mixing chamber, an oxygen-containing gas with a feed gas obtained by mixing steam with a hydrocarbon fuel, and a reformation step of guiding the mixed gas obtained in the mixing chamber into a catalytic reaction chamber via an antechamber provided on the upstream side of the catalytic reaction chamber, and bringing the mixed gas into contact with a reforming catalyst and thereby obtaining a hydrogen-containing gas by means of a partial oxidation reaction and a steam reforming reaction, and relates to a manufacturing apparatus that makes use of this kind of method for manufacturing a hydrogen-containing gas.

2. Background Art

A hydrogen-rich gas can be obtained by utilizing a catalytic reaction to reform a hydrocarbon fuel as a feed gas for FT (Fischer-Tropsch) synthesis, methanol synthesis, or ammonia synthesis, for example. Partial oxidation reactions and steam reforming reactions are known as catalytic reformation reactions of this kind for hydrocarbon fuels. The above-mentioned partial oxidation reaction proceeds according to the chemical formula given as Chemical Formula 1 below, and is what is known as an exothermic reaction.

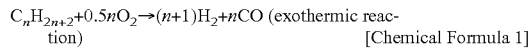

$C_nH_{2n+2} + 0.5nO_2 \rightarrow (n+1)H_2 + nCO$ (exothermic reaction)  [Chemical Formula 1]

The above-mentioned steam reforming reaction proceeds according to the chemical formula given as Chemical Formula 2 below, and is what is known as an endothermic reaction.

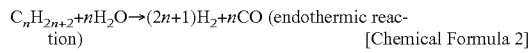

$C_nH_{2n+2} + nH_2O \rightarrow (2n+1)H_2 + nCO$ (endothermic reaction)  [Chemical Formula 2]

Therefore, a partial oxidation reaction and a steam reforming reaction can both be brought about by proper selection of the reforming catalyst. The partial oxidation reaction can be brought about on the pre-stage side of the catalytic reaction chamber, and the heat thereof can be utilized to bring about partial oxidation and steam reformation on the post-stage side of the catalytic reaction chamber.

In view of this, it has been proposed that a hydrogen-rich gas can be obtained by mixing steam and a hydrocarbon fuel to obtain a feed gas, mixing an oxygen-containing gas (such as pure oxygen) with this feed gas, subjecting the mixed gas thus obtained to a partial oxidation reaction on the pre-stage side of a catalyst layer, raising the temperature of the reaction gas to the temperature required for a steam reforming reaction, and mainly bringing about a steam reforming reaction on the post-stage side of the catalyst layer.

This reforming technology is called autothermal reformation, in which a series of reactions (the reactions of Chemical Formulas 1 and 2) occur at the same time.

With this kind of reformation, when a single reaction chamber is used for the catalytic reaction chamber filled with the reforming catalyst, the temperature begins to rise near the inlet of the catalytic reaction chamber, and the temperature rises steadily downstream, reaching the peak temperature. After this, the temperature settles down to an equilibrium temperature that is determined by the inlet temperature, the inlet gas composition, and the reaction pressure.

The technology disclosed in Patent Document 1 is known as this kind of autothermal technology.

With the technology disclosed in Patent Document 1, as discussed in the Claims of the Specification thereof, there is proposed "a hydrogen generating apparatus for generating hydrogen by bringing a raw material containing a hydrocarbon compound, water, and air into contact with a reforming catalyst body, wherein the reforming catalyst body is constituted by two stages, a reforming catalyst containing at least platinum or rhodium is disposed in the pre-stage, a reforming catalyst containing at least ruthenium or rhodium is disposed in the post-stage, and the reforming catalyst in the pre-stage and the reforming catalyst in the post-stage are made up of mutually different elements.

When this proposed constitution is employed, a reaction including steam reformation can be conducted after a partial oxidation reaction is brought about by the reforming catalyst on the pre-stage side and the temperature has reached a specific region.

Patent document 1: JP 2002-121007A (Claims)

In this conventional technique, however, there has been no debate whatsoever about the state of the non-catalyst portion located upstream from the catalytic reaction chamber.

The non-catalyst portion located upstream from the catalytic reaction chamber is called the antechamber in this application; since the reaction that occurs near the inlet of the catalytic reaction chamber is an exothermic reaction, the temperature at this portion can rise quite high. Therefore, the temperature is also quite high at the outlet portion of the antechamber (the portion linked to the inlet into the catalytic reaction chamber). If we here consider the gas that reaches this portion, we see that the gas at this portion is a mixed gas that results from oxygen being mixed into feed gas that is a mixture of steam and a hydrocarbon fuel, and because oxygen and hydrocarbon fuel are contained, there is the potential for self-ignition. If self-ignition should occur at this site, soot will be generated and the gas temperature will be abnormally high, among other problems, which causes the inside of the antechamber to be in an unstable state, and the antechamber and catalytic reaction chamber cannot be kept in a good operating state.

The present invention was conceived in light of the above situation, and it is an object thereof to provide a method for manufacturing a hydrogen-containing gas, with which a hydrogen-containing gas is obtained by means of a partial oxidation reaction and a steam reforming reaction, wherein an antechamber provided on the upstream side of a catalytic reaction chamber is in a stable state, and to provide a manufacturing apparatus that makes use of this method.

SUMMARY OF THE INVENTION

The characteristic constitution of the method for manufacturing a hydrogen-containing gas, for achieving the stated object, by executing a mixing step of mixing, in a mixing chamber, an oxygen-containing gas with a feed gas obtained by mixing steam with a hydrocarbon fuel, and a reformation step of guiding the mixed gas obtained in the mixing chamber into a catalytic reaction chamber via an antechamber provided on the upstream side of the catalytic reaction chamber, and bringing the mixed gas into contact with a reforming catalyst and thereby obtaining a hydrogen-containing gas by means of a partial oxidation reaction and a steam reforming reaction, is as follows.

Specifically, the catalytic reaction chamber includes a first catalyst section in which is disposed a first reforming catalyst that has good low-temperature oxidation activity, and a second catalyst section which is provided on the downstream side of the first catalyst section and in which is disposed a second reforming catalyst that has good reforming activity, and the mixed gas is introduced into the catalytic reaction chamber after the temperature of the antechamber has been set to at least a minimum partial-oxidation temperature and below a self-ignition temperature, where the self-ignition temperature is the temperature at which the mixed gas self-ignites during the advection period required for the mixed gas to move from the mixing chamber to the catalytic reaction chamber, and the minimum partial-oxidation temperature is the minimum temperature at which the first reforming catalyst undergoes the partial oxidation reaction.

With this method, the catalyst in the catalytic reaction chamber is divided into a first reforming catalyst and a second reforming catalyst, the first reforming catalyst, which has good low-temperature oxidation activity, is disposed on the inlet side, and the second reforming catalyst, which has good reforming activity, is disposed downstream from the first reforming catalyst. As for the part from the antechamber to the first reforming catalyst, the mixed gas reaches the inlet of the catalytic reaction chamber at a temperature that is below the self-ignition temperature but at least as high as the minimum partial-oxidation temperature.

As a result, at this antechamber portion, the partial oxidation reaction can be commenced by the first reforming catalyst after the gas has reliably reached the catalytic reaction chamber inlet, without causing any self-ignition, so instability in the state of the antechamber can be proactively avoided.

Furthermore, since the first reforming catalyst has good low-temperature oxidation activity, its catalytic reaction occurs even at relatively low temperatures. As a result, even if the temperature of the mixed gas in the antechamber is relatively low (below the self-ignition temperature), a partial oxidation reaction will proceed at the stage when the gas has been introduced into the catalytic reaction chamber, so the state of the mixed gas in the antechamber can be kept stable while the reaction is properly brought about at the catalytic reaction chamber inlet.

The first reforming catalyst described above as having good low-temperature oxidation activity can be a reforming catalyst that contains at least one of ruthenium and platinum, while the second reforming catalyst that has good reforming activity can be a reforming catalyst that contains at least one of nickel, rhodium, and ruthenium.

The characteristic constitution of the hydrogen-containing gas manufacturing apparatus that makes use of this method, which comprises a mixing chamber in which an oxygen-containing gas is mixed with a feed gas obtained by mixing steam with a hydrocarbon fuel, and a catalytic reaction chamber into which the mixed gas obtained in the mixing chamber is guided via an antechamber, and in which the mixed gas is brought into contact with a reforming catalyst, and a hydrogen-containing gas is obtained by means of a partial oxidation reaction and a steam reforming reaction, is such that the catalytic reaction chamber comprises, from the inlet side, a first catalyst section in which is disposed a first reforming catalyst that has good low-temperature oxidation activity, and a second catalyst section which is provided on the downstream side of the first catalyst section and in which is disposed a second reforming catalyst that has good reforming activity, and said apparatus comprises antechamber temperature setting means for setting the temperature of the antechamber to at least a minimum partial-oxidation temperature and below a self-ignition temperature, where the self-ignition temperature is the temperature at which the mixed gas self-ignites during the advection period required for the mixed gas to move from the mixing chamber to the catalytic reaction chamber, and the minimum partial-oxidation temperature is the minimum temperature at which the first reforming catalyst undergoes the partial oxidation reaction.

With the above-mentioned hydrogen-containing gas manufacturing method, it is preferable if the first reforming catalyst concentration of the first catalyst section is the concentration at which a first catalyst section outlet temperature is no higher than the self-ignition temperature and is at least the temperature at which the second catalyst undergoes partial oxidation, in a state in which the temperature of the antechamber has been set to at least the minimum partial-oxidation temperature and below the self-ignition temperature.

With a hydrogen-containing gas manufacturing apparatus that makes use of this method, the first reforming catalyst concentration of the first catalyst section is the concentration at which a first catalyst section outlet temperature is no higher than the self-ignition temperature and is at least the temperature at which the second catalyst undergoes partial oxidation, in a state in which the temperature of the antechamber has been set to at least the minimum partial-oxidation temperature and below the self-ignition temperature.

The role of the first reforming catalyst in this application is to raise the temperature of the mixed gas to the temperature at which the second reforming catalyst induces an oxidation reaction. Meanwhile, the first reforming catalyst outlet temperature is determined mainly by the inlet temperature of the catalytic reaction chamber, the heat generated by partial oxidation at the first catalyst section, and the heat transmitted from the second catalyst section. In view of this, with this method, the temperature at the first catalyst section, which has good low-temperature oxidation activity, is raised high enough for the second reforming catalyst to induce a partial oxidation reaction, while the catalyst combustion is utilized. Even though we refer here to the temperature at which the second reforming catalyst can undergo partial oxidation, there is still a restriction that the temperature be no higher than the self-ignition temperature.

With this structure, oxidation of the mixed gas by the second reforming catalyst substantially begins at and proceeds from near the boundary between the first catalyst section and the second catalyst section (and especially near the inlet of the second catalyst section). That is, conventional partial oxidation and steam reforming can proceed at the second catalyst section, while the first catalyst section serves as a functional site that suitably sets the starting point for the partial oxidation and steam reforming that proceed at the second catalyst section.

When this structure is employed, a heat blocking layer with lower thermal conduction characteristics than the first catalyst section is preferably provided between the first catalyst section and the second catalyst section.

That is, the apparatus for manufacturing a hydrogen-containing gas can be such that a heat blocking layer with lower thermal conduction characteristics than the first catalyst section is provided between the first catalyst section and the second catalyst section.

As described above, the first catalyst section outlet temperature is defined as being no higher than the self-ignition temperature and at least the temperature at which the second catalyst undergoes partial oxidation. Meanwhile, near the inlet to the second catalyst section, partial oxidation by the second catalyst section proceeds and the temperature quickly rises to the level at which steam reforming is possible, after which the peak temperature is reached, and then the equilibrium temperature is reached, which is lower than the peak temperature. Here, when the second catalyst has high activity, the reaction from the temperature at the second catalyst section inlet to the peak temperature occurs extremely rapidly, and the peak temperature is sometimes reached near the inside of the second catalyst section inlet. In this situation, the effect of the peak temperature tends to be linked to higher temperature on the upstream side, and when the first and second catalyst sections are integrated, there is the risk that the peak temperature location will shift toward the first catalyst section side, creating an unstable situation.

In view of this, a heat blocking layer is provided between the first catalyst section and the second catalyst section. Providing this heat blocking layer makes it possible to suppress heat transfer from the second catalyst section to the first catalyst section outlet side, which is lower in temperature than in the second catalyst section, and as a result, the predetermined temperature for the first catalyst section outlet (a temperature no higher than the self-ignition temperature and at least the temperature at which the second catalyst undergoes partial oxidation) can be stably maintained.

An inert member that has no catalytic activity is preferably mixed with the first catalyst section to set the first reforming catalyst concentration.

In this application, a catalyst that has good low-temperature oxidation activity is used as the first reforming catalyst, but it is necessary to confine the location where the peak temperature appears as discussed above to the second catalyst section. Specifically, it is necessary to keep the amount of heat generated by the first catalyst section to a level that will result in a suitable temperature at the outlet from this section. In view of this, an inert member can be mixed with the first catalyst section, and the amounts of the first reforming catalyst and the inert member (the first reforming catalyst concentration) adjusted, so as to adjust the first catalyst section outlet temperature to the targeted temperature in this application.

It is also preferable in this configuration is the first catalyst section outlet temperature is the self-ignition temperature.

When a hydrogen-containing gas manufacturing apparatus is in its normal operating state, the above-mentioned first catalyst section outlet temperature is the above-mentioned self-ignition temperature.

By thus having the first catalyst section outlet temperature be the self-ignition temperature, the second catalyst section inlet temperature is set as high as possible, and the partial oxidation reaction and steam reforming reaction conducted in the second catalyst section are brought about rapidly near the second catalyst section inlet, and the first catalyst section can be used favorably.

At this point, oxygen substantially remains behind as indicated by the one-dot chain line in FIG. 3. Therefore, if ruthenium, which has good oxidation activity, is provided at the inlet to the second catalyst section where the reforming reaction substantially starts, oxygen will be present at high temperature, which tends to lead to a problem in that the ruthenium is degraded or scattered.

This is dealt with in the constitution of this application by having the first catalyst section, with its restriction to be no higher than the self-ignition temperature, be at an even lower temperature, although the temperature has a tendency to rise. As a result, no problems with degradation, scattering, or the like are encountered even though ruthenium is used at this site. Specifically, ruthenium, which has good low-temperature oxidation activity, can be used effectively and favorably.

In the constitution described up to this point, it is preferable that the temperature of the mixed gas flowing through the antechamber is maintained higher than a minimum antechamber temperature and lower than a maximum antechamber temperature, where the minimum antechamber temperature is the temperature that is higher between the minimum partial-oxidation temperature and the dew point temperature of the mixed gas, and the maximum antechamber temperature is the self-ignition temperature.

Steam is mixed into the mixed gas used in the hydrogen-containing gas manufacturing method according to the present invention, and the dew point of this steam poses a problem. As the reforming reaction approaches the minimum temperature at which partial oxidation can occur, condensation may occur depending on the state of the mixed gas. If condensation occurs, it will hamper the catalytic reaction, and good gas flow cannot be ensured. In view of this, a good operating state can be maintained by taking into account the dew point temperature in relation to the mixed gas state, and ensuring the proper mixed gas state in the antechamber.

With a hydrogen-containing gas manufacturing apparatus of this constitution, the temperature of the mixed gas flowing through the antechamber is maintained higher than a minimum antechamber temperature and lower than a maximum antechamber temperature, where the minimum antechamber temperature is the temperature that is higher between the minimum partial-oxidation temperature and the dew point temperature of the mixed gas, and the maximum antechamber temperature is the self-ignition temperature.

With the hydrogen-containing gas manufacturing method described up to this point, it is preferable if the sulfur compound concentration of the hydrocarbon fuel is 1 ppb or less.

As the sulfur oxide compound concentration rises in the hydrocarbon fuel, the peak temperature of the reaction that occurs in the catalytic reaction chamber has a tendency to rise. If the reforming catalyst is ruthenium, keeping the sulfur compound concentration to 1 ppb or less allows the peak temperature inside the catalytic reaction chamber to be a temperature at which a stable reaction can be obtained. The amount here only needs to be 1 ppb or less, and there is no lower limit thereof. Lowering this concentration also avoids degradation of the reforming catalyst.

Ruthenium is known as a catalyst that has good low-temperature oxidation activity and good reforming activity, but when ruthenium is used in different concentrations for both the first and second catalysts in this application, it can be used as follows.

Specifically, as a hydrogen-containing gas manufacturing method including a mixing step of mixing, in a mixing chamber, an oxygen-containing gas with a feed gas obtained by mixing steam with a hydrocarbon fuel, and a reformation step of guiding the mixed gas obtained in the mixing chamber into a catalytic reaction chamber via an antechamber provided on the upstream side of the catalytic reaction chamber, and bringing the mixed gas into contact with a reforming catalyst and thereby obtaining a hydrogen-containing gas by means of a partial oxidation reaction and a steam reforming reaction, the catalytic reaction chamber includes a first catalyst section in which is disposed a ruthenium catalyst, and a second catalyst section which is provided on the downstream side of the first catalyst section and in which is disposed a ruthenium catalyst, in a state of higher concentration than in the first catalyst section, and the mixed gas is introduced into the catalytic reaction chamber after the temperature of the antechamber has been set to at least a minimum partial-oxidation temperature and below a self-ignition temperature, where the self-ignition temperature is the temperature at which the mixed gas self-ignites during the advection period required for the mixed gas to move from the mixing chamber to the catalytic reaction chamber, and the minimum partial-oxidation temperature is the minimum temperature at which the first reforming catalyst undergoes the partial oxidation reaction, and the ruthenium catalyst concentration of the first catalyst section is set to the concentration at which a first catalyst section outlet temperature is no higher than the self-ignition temperature and is at least the temperature at which the second catalyst undergoes partial oxidation, in a state in which the temperature of the antechamber has been set to at least the minimum partial-oxidation temperature and below the self-ignition temperature, and a heat blocking layer with lower thermal conduction characteristics than the first catalyst section is provided between the first catalyst section and the second catalyst section.

In this case, the hydrogen-containing gas manufacturing apparatus can be one that comprises a mixing chamber in which an oxygen-containing gas is mixed with a feed gas obtained by mixing steam with a hydrocarbon fuel, and the catalytic reaction chamber into which the mixed gas obtained in the mixing chamber is guided via an antechamber, in which the mixed gas is brought into contact with a reforming catalyst, and a hydrogen-containing gas is obtained by means of a partial oxidation reaction and a steam reforming reaction, wherein the catalytic reaction chamber comprises, from the inlet side, a first catalyst section in which is disposed a ruthenium catalyst, and a second catalyst section which is provided on the downstream side of the first catalyst section and in which is disposed a ruthenium catalyst in a state of higher concentration than that in the first catalyst section, and said apparatus comprises antechamber temperature setting means for setting the temperature of the antechamber to at least a minimum partial-oxidation temperature and below a self-ignition temperature, where the self-ignition temperature is the temperature at which the mixed gas self-ignites during the advection period required for the mixed gas to move from the mixing chamber to the catalytic reaction chamber, and the minimum partial-oxidation temperature is the minimum temperature at which the first reforming catalyst undergoes the partial oxidation reaction, and the ruthenium catalyst concentration of the first catalyst section is the concentration at which a first catalyst section outlet temperature is no higher than the self-ignition temperature and is at least the temperature at which the second catalyst undergoes partial oxidation, in a state in which the temperature of the antechamber has been set to at least the minimum partial-oxidation temperature and below the self-ignition temperature, and a heat blocking layer with lower thermal conduction characteristics than the first catalyst section is provided between the first catalyst section and the second catalyst section.

When ruthenium alone is used as above, as has already been described, an inert member that has no catalytic activity can be mixed into the first catalyst section to adjust its ruthenium concentration.

Also, the problem of condensation can be solved by keeping the temperature of the mixed gas flowing through the antechamber below a maximum antechamber temperature and higher than a minimum antechamber temperature, where the minimum antechamber temperature is the temperature that is higher between the minimum partial-oxidation temperature and the dew point temperature of the mixed gas, and the maximum antechamber temperature is the self-ignition temperature.

DESCRIPTION OF THE PREFERRED EMBODIMENTS

A hydrogen-containing gas manufacturing apparatus 1 according to the present invention will now be described through reference to the drawings.

GTL Manufacturing Process

Figure 1:
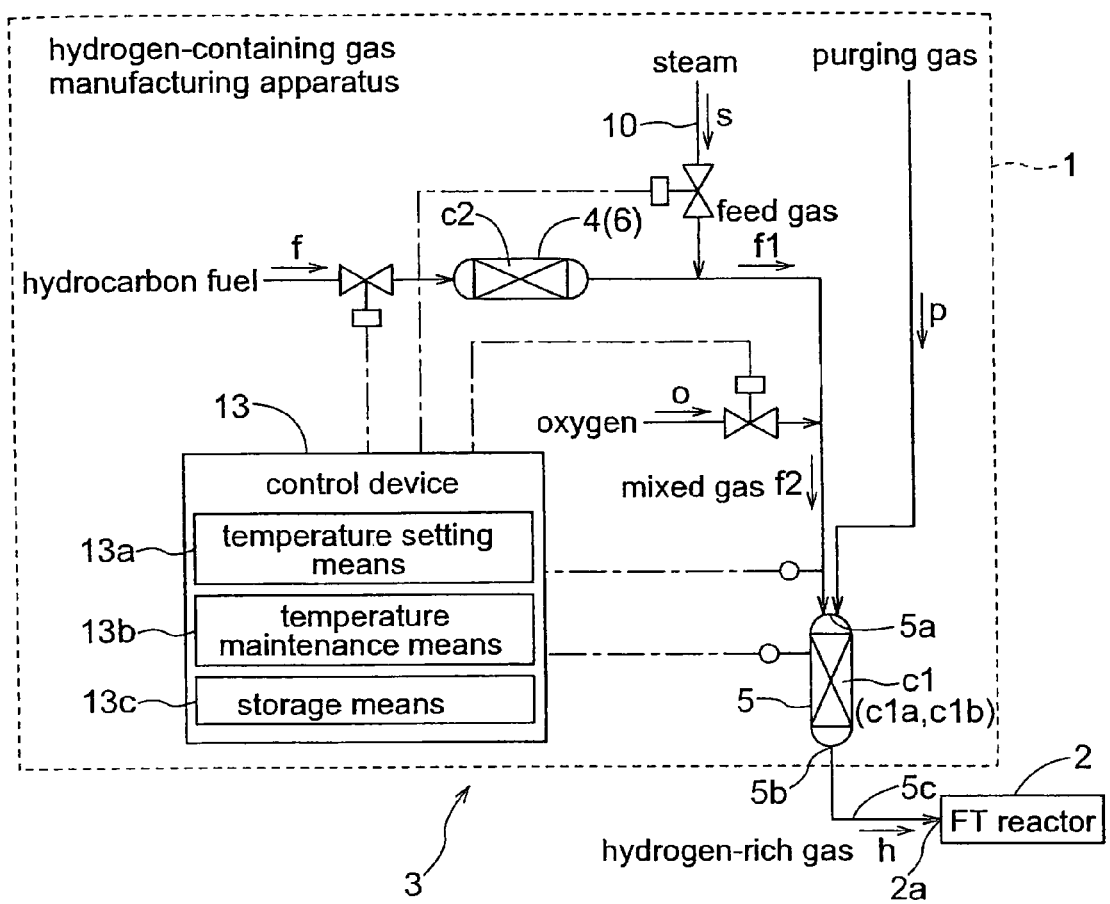
FIG. 1 is a diagram of the configuration of a GTL manufacturing process equipped with the hydrogen-containing gas manufacturing apparatus according to the present invention.

FIG. 1 shows the configuration of a GTL (Gas-To-Liquid) manufacturing process 3 in which the hydrogen-containing gas manufacturing apparatus 1 according to the present invention is provided on the upstream side of an FT synthesis reactor (labeled FT reactor in the drawings) 2 in which one of the feed gases is a hydrogen-containing gas. As shown in the drawing, this system 3 comprises the hydrogen-containing gas manufacturing apparatus 1 of the present invention provided upstream from the FT synthesis reactor 2; a hydrocarbon fuel f (such as natural gas), steam s, and oxygen o (the oxygen-containing gas) are supplied to the hydrogen-containing gas manufacturing apparatus 1 and reformed, after which hydrogen-rich gas h is sent to the FT synthesis reactor 2.

In addition to the above-mentioned natural gas, the hydrocarbon fuel can be a gaseous alcohol, ether, LPG, naphtha, gasoline, kerosene, light oil, heavy oil, asphaltene oil, oil-sand oil, liquefied coal oil, shale oil, waste plastic oil, biofuel, or the like.

The system of processing the hydrocarbon fuel f will now be described. The hydrocarbon fuel f is desulfurized to 1 ppb or less in a desulfurization apparatus 4, after which steam s is added to obtain what is called the feed gas f1 in the present invention. Oxygen o is further mixed as an oxygen-containing gas into the feed gas f1 as shown in FIG. 1, and this mixture is introduced into a single catalytic reaction chamber 5. In this catalytic reaction chamber 5 is disposed a reforming catalyst c1 capable of subjecting the mixed gas f2 (obtained by mixing the hydrocarbon fuel f, steam s, and oxygen o) to an autothermal reforming reaction. In this catalytic reaction chamber 5, mainly a partial oxidation reaction occurs on the inlet side, and mainly a steam reforming reaction occurs downstream from this location.

Specific, favorable examples of this kind of reforming catalyst include ruthenium, platinum, nickel, rhodium, and other noble metal catalysts. In a first embodiment, however, ruthenium and platinum are used as a first reforming catalyst c1a with good low-temperature oxidation activity, and nickel and rhodium are used as a second reforming catalyst c1b with good reforming activity. The reason for thus dividing the reforming catalyst c1 into two groups is that in this application, in order to make the temperature of the mixed gas inside the antechamber 9 below the self-ignition temperature T3, the increase from the temperature inside the antechamber 9 to the temperature at which the second reforming catalyst can perform oxidation is brought about by the first reforming catalyst c1a, so that the state of the antechamber 9 can be stabilized as much as possible.

Meanwhile, in a second embodiment, ruthenium is used as a first reforming catalyst d1 with good low-temperature oxidation activity, and is also used as a second reforming catalyst d1 with good reforming catalyst. The reason for thus treating ruthenium as both the first reforming catalyst and the second reforming catalyst is that experiments and investigations by the inventors have revealed that good, stable operation is possible at a relatively low peak temperature when ruthenium is used in different concentrations for the first catalyst section and the second catalyst section in a system in which partial oxidation and steam reforming are performed.

These catalysts may be in any shape, and there are no restrictions on carriers, but it is preferable to use a carrier whose main component is one selected from among alumina, zirconia, silica, titania, magnesia, and calcia. Preferably, the catalyst is supported on a carrier, and used in the molded form of tablets, spheres, or rings, or in a honeycomb shape.

If a typical example of the manufacture of this kind of catalyst is described for when ruthenium is supported on an alumina carrier, for example, the catalyst can be prepared in the following manner: a spherical alumina carrier (4 to 6 mm) is immersed in a ruthenium chloride aqueous solution and dried for 2 hours at 80° C. in air, after which it is fixed (with an NaOH aqueous solution), reduced (with hydrogen), washed (at a temperature of 90° C.), and dried (left at 80° C. in air).

If a case of supporting platinum, nickel, and rhodium on an alumina carrier is described, the catalyst can be prepared by using chloroplatinic acid, rhodium nitrate, nickel nitrate, and rhodium chloride instead of the above-mentioned ruthenium chloride, and by baking for 1 hour at 650° C.

The supported percentage can be 3.0 wt %, for example, for which the catalyst may be dispersed in a 30 wt % (as silica) colloidal silica solution to create a catalyst slurry, and this catalyst slurry may be supported in a cordierite honeycomb with 400 cells, a diameter of 24 mm, and a length of 2 cm. These are dipped in the catalyst slurry and backed in air for 1 hour at 500° C. The supported amount is 3 g of noble metal per cubic decimeter (liter) of honeycomb volume.

In the second embodiment discussed below, the supported percentage is set to a value lower than 3.0 wt %.

In this application, a good autothermal reforming reaction is produced in the catalytic reaction chamber 5 by having the mixed gas f2 introduced favorably into the catalytic reaction chamber 5. What is important for producing a "good reaction" here is that the partial oxidation reaction is brought about first near the inlet 5a, and that no carbon is generated inside the catalytic reaction chamber 5. Furthermore, "good reaction" means that the state (and particularly the temperature state) of the mixed gas f2 at the inlet 5a of the catalytic reaction chamber 5 is suitably controlled, so that the state inside the reaction chamber makes a suitable transition from a state of just partial oxidation to a state of partial oxidation that includes steam reforming.

As shown in FIG. 1, the catalytic reaction chamber 5 is disposed in the vertical direction, the feed gas f1 (a gas obtained by mixing the steam s with the hydrocarbon fuel f) is supplied from the top side, a mixed gas f2 into which the oxygen o has been mixed is introduced from the inlet 5a provided on the upper side of the catalytic reaction chamber 5, the reforming reaction is concluded, and the hydrogen-rich gas h is sent from under the catalytic reaction chamber 5 toward the FT synthesis reactor 2.

In this application, a first embodiment and a second embodiment are given as examples of the hydrogen-containing gas manufacturing apparatus 1.

First Embodiment

The specific constitution of the hydrogen-containing gas manufacturing apparatus 1 of this embodiment will now be described through reference to FIGS. 1 and 2.

Hydrogen-Containing Gas Manufacturing Apparatus

This hydrogen-containing gas manufacturing apparatus 1 is constituted so as to handle the desulfurization, steam addition, oxygen mixing, and reforming steps to which the hydrocarbon fuel f described above is subjected.

The desulfurization is carried out in a desulfurization chamber 6, producing the feed gas f1 in which the steam s is mixed with the hydrocarbon fuel f sent from the desulfurization chamber 6. FIG. 2 shows the specific configuration of a feed gas chamber 7, mixing chamber 8, antechamber 9, and catalytic reaction chamber 5 in this apparatus 1. The present invention is characterized by the configuration and usage mode of the antechamber 9, so FIG. 2 only shows the top side of the catalytic reaction chamber 5. The exit side of the catalytic reaction chamber 5 provided on the lower side is connected to a hydrogen introduction port 2a of the FT synthesis reactor 2 by a connector pipe 5c via an outlet 5b.

Desulfurization

A desulfurization catalyst c2, such as a copper-zinc-based high-order desulfurization catalyst obtained by mixing a hydrogenation desulfurization catalyst (such as NiMox or CoMox), an adsorption desulfurization agent (ZnO), and copper oxide, zinc oxide, or the like, is disposed in the desulfurization chamber 6, and the sulfur compound concentration is lowered to 1 ppb or less in this chamber 6.

In addition to the above-mentioned copper-zinc-based high-order desulfurization catalyst, it is also possible to employ a silver-based catalyst, as well as a desulfurization catalyst containing nickel, chromium, manganese, iron, cobalt, palladium, iridium, platinum, ruthenium, rhodium, gold, or the like.

Steam Mixing

After undergoing desulfurization, the steam s supplied through a separate steam supply pipe 10 has added to the hydrocarbon fuel f. The amount of steam s versus the hydrocarbon fuel f here is 0.1 to 3.0 (and preferably 0.1 to 1.0) as the proportion of $H_2O$ to carbon C contained in the fuel (the molar ratio $H_2O/C$). The temperature at this site is about 200 to 400° C. (and preferably 200 to 300° C.). In this application, the gas obtained in this manner is called the feed gas f1.

Figure 2:
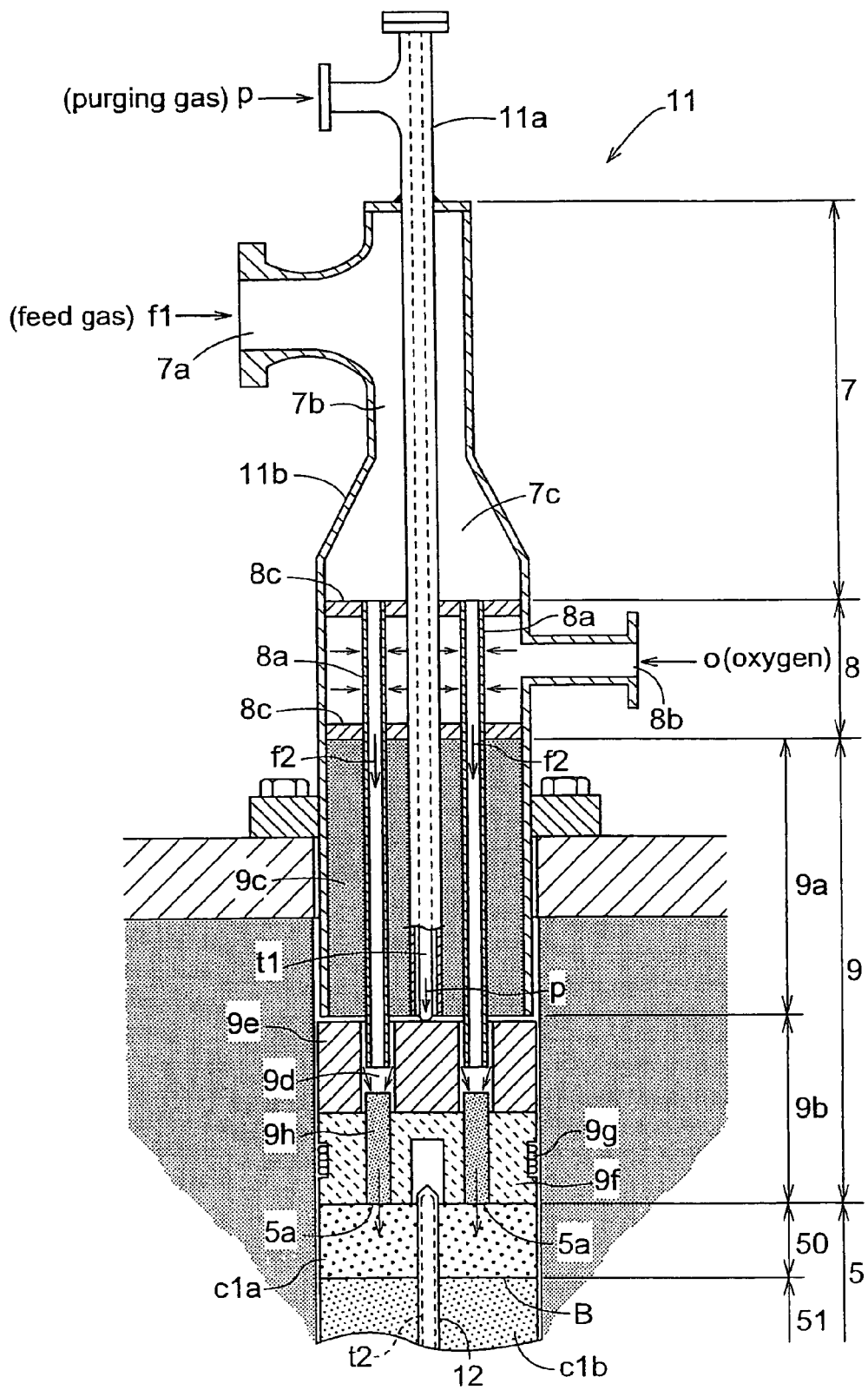
FIG. 2 is a diagram of the configuration of the upper part of a reforming unit.

As shown in FIGS. 1 and 2, oxygen o is also supplied to the hydrogen-containing gas manufacturing apparatus 1 of the present invention. The feed gas f1 may also be supplied, or the hydrocarbon fuel f and steam s that are the component gases thereof, or a purging gas p (such as an inert gas). These gases are then suitably reacted in a reforming unit 11, which will be discussed in detail below.

Reforming Unit 11

As shown in FIG. 2, the reforming unit 11 is equipped with the feed gas chamber 7, the mixing chamber 8, and the antechamber 9 on the upper side of the unit, and with the catalytic reaction chamber 5 on the lower side. The upper side of the reforming unit 11 has a sort of double-cylinder structure, allowing the purging gas p to be supplied through the inner pipe 11a to the lower part of the antechamber 9. As shown in FIG. 2, a thermocouple t1 for temperature measurement is disposed inside this inner pipe 11a, extending to the approximate middle of the antechamber. This allows the typical temperature (inlet temperature) of the antechamber 9 to be measured.

Feed Gas Chamber 7

As shown in FIG. 2, the feed gas chamber 7 comprises an introduction port 7a through which is introduced the feed gas f1 mixed with the steam s, a middle path section 7b into which the introduction port 7a opens, and an expanded channel section 7c whose channel cross section is larger than that of the middle path section 7b. The mixing chamber 8 is provided below this expanded channel section 7c.

Mixing Chamber 8

The mixing chamber 8 employs what is known as a shell-and-tube type of mixing structure, and is configured so that oxygen o flows from an oxygen chamber 8b provided on the outside, into the channel in tubes 8a into which the feed gas f1 flows from the expanded channel section 7c. Therefore, the mixed gas f2 that is a mixture of the feed gas f1 and the oxygen o can be formed when the oxygen o flows into the feed gas f1.

As shown in FIG. 2, the tubes 8a extend downward beyond the distance between dividers 8c that partition the mixing chamber 8, and are constituted so that a sufficiently mixed state is obtained when the gas flows down through this channel.

The amount of oxygen o here with respect to the hydrocarbon fuel f is 0.05 to 1.0 (and preferably 0.3 to 0.7) as the proportion of oxygen $O_2$ to carbon C contained in the fuel (the molar ratio $O_2/C$). The temperature at this site is about 200 to 400° C. (and preferably 200 to 300° C.). In this application, the gas obtained in this manner is called the mixed gas f2.

Antechamber 9

The antechamber 9 is provided so as to function as an adjusting chamber with respect to the catalytic reaction chamber 5, and comprises an introduction section 9a through which the above-mentioned tubes 8a extend, and an adjustment section 9b provided in between the introduction section 9a and the catalytic reaction chamber 5.

As shown in FIG. 2, the tubes 8a protrude and extend downward through the introduction section 9a, and the mixed gas f2 is released from the distal ends of these tubes 8a. The portion 9c around the outer periphery of the tubes 8a is solid, so no gas accumulates there. Furthermore, a structure is employed in which the above-mentioned purging gas p is supplied via the inner pipe 11a to the distal end of the introduction section 9a, and the above-mentioned supply of the purging gas p and the solid structure of the outside of the tubes 8a combine to prevent the mixed gas f2 from rising or stagnating.

The adjustment section 9b suitably adjusts the temperature of the antechamber 9 at this site, its channel expands while the mixed gas f2 that has flowed through the tubes 8a (which are a relatively narrow channel) is further mixed, and affords smoother introduction into the catalytic reaction chamber 5. Therefore, as shown in FIG. 2, there is a slight increase in cross sectional area at a gas channel 9d through which the mixed gas f2 flows in the adjustment section 9b, and this lowers the flow rate of the gas.

With the configuration described so far, a structure is employed in which the channel cross sectional area is set so that the flow rate of the mixed gas f2 in the mixing chamber 8 and the antechamber 9 is higher than the minimum flow rate of the feed gas f1 in the feed gas chamber 7, and the residence time of the mixed gas f2 in this chamber is kept as short as possible.

As shown in FIG. 2, blocks 9e and 9f are provided on the upper and lower sides, respectively, of the adjustment section 9b in a state of forming the gas channel 9d of the adjustment section 9b. The reason for using these materials is to prevent heat from the catalytic reaction chamber 5 from propagating upstream, and thereby provide good thermal insulation. Therefore, these blocks are preferably made of alumina, silicon nitride, or another such ceramic material. In FIG. 2, a ceramic rope 9g is disposed around the outer periphery of the block 9f, and keeps gas from flowing through gaps between the block 9f and the fire-resistant material.

In the example shown in FIG. 2, a thermal insulating material 9h that is breathable is disposed within the gas channel 9d of the adjustment section 9b, which provides thermal insulation at the boundary between the catalytic reaction chamber 5 and the antechamber 9 and also prevents back-flow of the mixed and unreacted gas.

Catalytic Reaction Chamber 5

The catalytic reaction chamber 5 is the most important part of the hydrogen-containing gas manufacturing apparatus 1 according to the present invention, and is where the reforming catalyst c1 is disposed as discussed above.

Furthermore, the catalytic reaction chamber 5 according to the present invention employs a unique constitution with regard to the distribution and selection of the type of reforming catalyst disposed in its interior. This distribution state will be described through reference to FIG. 3.

Figure 3:
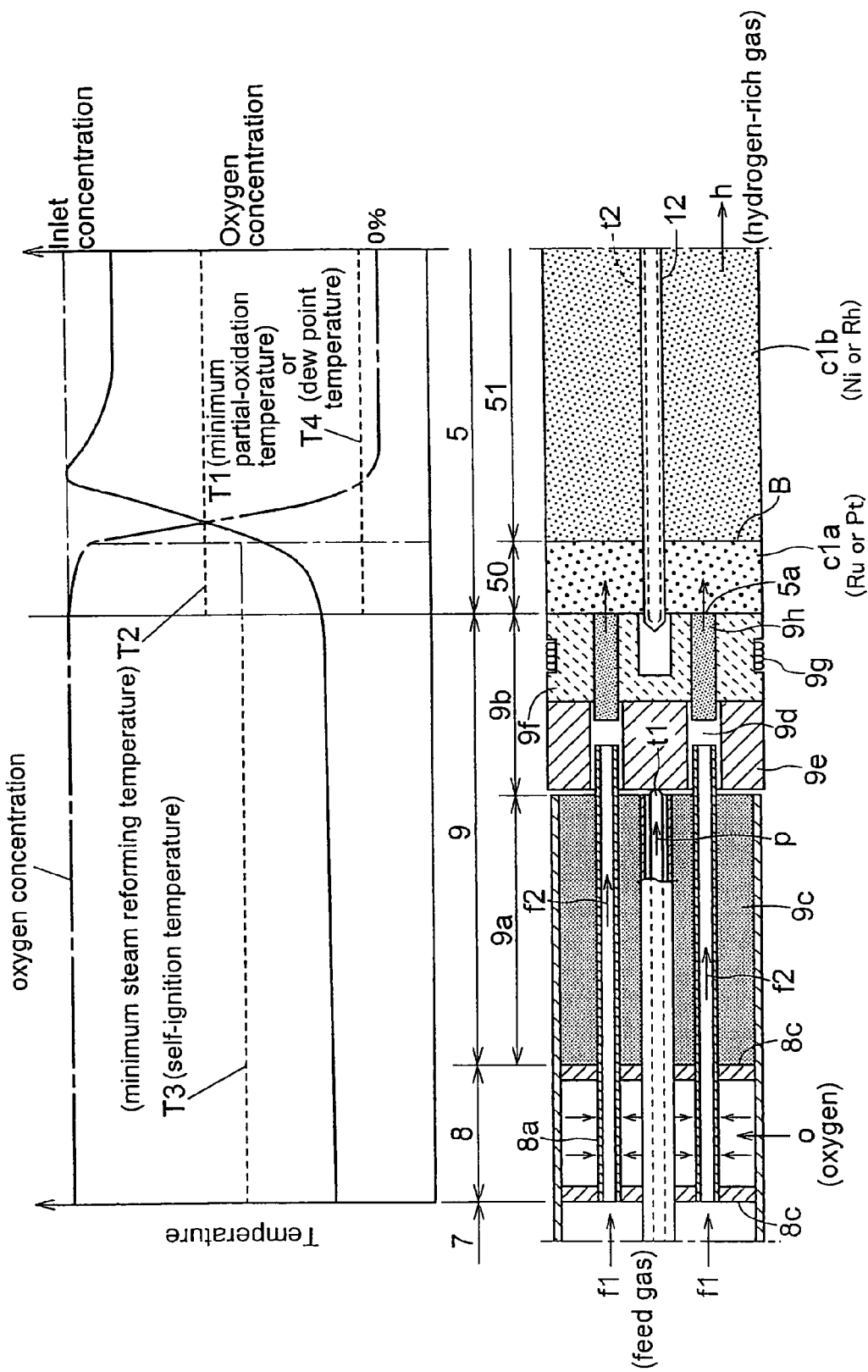
FIG. 3 illustrates the relationship between the temperature at the inlet of the catalytic reaction chamber and the temperature inside the catalytic reaction chamber.

FIG. 3 shows a graph, with the direction of flow of gas (the mixed gas flows from left to right) on the horizontal axis, and the temperature and oxygen concentration on the vertical axis. This graph at the top of FIG. 3 indicates the temperature of the mixed gas with a solid line, based on the temperature axis on the left side, and also indicates the minimum partial-oxidation temperature T1, minimum steam reforming temperature T2, the self-ignition temperature T3, and the dew point temperature T4 with broken lines in the lateral direction.

Meanwhile, in this graph at the top of FIG. 3, the oxygen concentration is indicated with a one-dot chain line, based on the oxygen concentration axis on the right side. As is clear from this graph, the oxygen concentration is obtained in the mixing chamber inside the antechamber, the inlet concentration reached at the antechamber inlet is maintained while the gas reaches the catalytic reaction chamber inlet 5a, and after the gas passes the inlet to the second catalyst section c1b, substantially the entire amount has been consumed.

As shown in FIG. 3, the catalytic reaction chamber 5 comprises, from the inlet 5a side, a first catalyst section 50 in which is disposed the first reforming catalyst c1a, which has good low-temperature oxidation activity, and a second catalyst section 51 which is linked on the downstream side of the first catalyst section 50 and in which is disposed the second reforming catalyst c1b, which has good reforming activity. As described above and as shown in FIG. 3, the first reforming catalyst c1a is a ruthenium-based catalyst, a platinum-based catalyst, or a mixed catalyst of these. Meanwhile, the second reforming catalyst c1b is a nickel-based catalyst, a rhodium-based catalyst, or a mixed catalyst of these.

The supported percentages of the first reforming catalyst c1a and the second reforming catalyst c1b in this example are 3 wt % ruthenium for the first catalyst and 3 wt % nickel for the second catalyst.

The distribution in the direction of flow of the first catalyst section 50 and the second catalyst section 51 will now be described. The positional relationship is determined such that the temperature at the boundary B between the first catalyst section 50 and the second catalyst section 51 is no higher than the self-ignition temperature and is at least the temperature at which the second catalyst can bring about an oxidation reaction.

The total gas flow supplied to the catalytic reaction chamber 5 is such that the gas spatial velocity (calculated for a standard state) per hour, using the amount of first catalyst+second catalyst as a reference, is 750 to 300,000 $h^{-1}$, and preferably 10,000 to 300,000 $h^{-1}$, and more preferably 50,000 to 300,000 $h^{-1}$.

There are no particular restrictions on the pressure during the reactions, and the reaction pressure can be varied according to the application. When the present invention is used in applications for GTL or other such liquid fuel synthesis, a pressure of about 2 to 7 MPa is used. When it is used in applications for the manufacture of hydrogen for fuel cells, on the other hand, the pressure is usually close to normal pressure (such as 1 MPa or lower).

The above is the constitution on the hardware side of the hydrogen-containing gas manufacturing apparatus 1 according to the present invention, but the apparatus of the present invention is configured so as to achieve the proper reaction state in the antechamber 9 and the catalytic reaction chamber 5.

Specifically, the apparatus 1 of the present invention is designed so as to achieve the proper inlet temperature of the mixed gas f2 going into the catalytic reaction chamber 5. For instance, in the constitution described so far, the gas channel 9d of the mixed gas f2 is made relatively small, and the flow rate in this gas channel 9d is raised, which keeps the residence time of the mixed gas f2 inside the antechamber 9 to a specific time or less. Also, good thermal insulation is achieved at the boundary between the catalytic reaction chamber 5 and the antechamber 9, so that the temperature of the catalytic reaction chamber 5 does not affect the antechamber 9. Introducing a purging gas p into the antechamber 9 and preventing stagnation and back-flow of the mixed gas f2, for example, are another feature on the hardware side in the present invention.

As shown in FIG. 1, the hydrogen-containing gas manufacturing apparatus 1 of the present invention is equipped with a control device 13 for controlling the reaction state. The apparatus is configured so that the type, amount, and temperature of the hydrocarbon fuel f going into the system, the amount and temperature of the steam s going into the system, and the amount and temperature of the oxygen o going into the system can be monitored by the control device 13.

Meanwhile, as shown in FIG. 2, the apparatus is configured so that the temperature at the inlet and outlet of the adjustment section 9b of the antechamber 9 (the inlet 5a of the catalytic reaction chamber), and the temperature in the flow direction within the catalytic reaction chamber 5 can be monitored by the thermocouples t1 and t2 inserted into the reforming unit 11 from the upper and lower sides of the unit 11 described above.

The amount of hydrocarbon fuel, the amount of steam, and the amount of oxygen going into the hydrogen-containing gas manufacturing apparatus 1 can be adjusted according to control commands from the control device 13.

The configuration of the control device 13 will now be described through reference to FIGS. 1 and 3. This control device 13 comprises a temperature setting means 13a for setting the temperature of the mixing chamber 8 and the antechamber 9 to a temperature below the self-ignition temperature T3, where the self-ignition temperature is the temperature at which the mixed gas f2 self-ignites during the advection period required for the mixed gas f2 to move from the mixing chamber 8 to the catalytic reaction chamber 5, at a temperature that is at least the minimum partial-oxidation temperature T1 and is below the minimum steam reforming temperature T2, where the minimum partial-oxidation temperature T1 is the minimum temperature at which the first reforming catalyst c1a undergoes the partial oxidation reaction, and the minimum steam reforming temperature T2 is the minimum temperature at which the second reforming catalyst c1b undergoes the steam reforming reaction.

This temperature setting means 13a comprises an antechamber mixed gas temperature maintenance means (simply labeled "temperature maintenance means" in FIG. 1) 13b for maintaining the temperature of the mixed gas f2 flowing through the antechamber 9 at a temperature that is lower than a maximum antechamber temperature and higher than a minimum antechamber temperature, where the minimum antechamber temperature is the temperature that is higher between the minimum partial-oxidation temperature and the dew point temperature T4 of the mixed gas f2, and the maximum antechamber temperature is the self-ignition temperature of the mixed gas f2.

The minimum and maximum temperatures in the control device 13 will now be described.

Minimum Temperature

The minimum partial-oxidation temperature is the minimum temperature T1 at which the mixed gas f2 undergoes a partial oxidation reaction upon contact with the first reforming catalyst c1a, and this minimum temperature T1 is determined by the first reforming catalyst c1a held in the catalytic reaction chamber 5. For example, if the first reforming catalyst c1a is the above-mentioned ruthenium-based catalyst, this temperature is about 200° C., and if the first reforming catalyst c1a is a platinum-based catalyst, the temperature is again about 200° C. Therefore, this minimum partial-oxidation temperature is stored in a storage means 13c provided to the control device 13, so that the minimum partial-oxidation temperature T1 can be read out and utilized as needed on the control device 13 side.

As to the mixed gas f2, meanwhile, the dew point temperature T4 of the mixed gas is determined according to the amounts of the hydrocarbon fuel f, steam s, and oxygen o. In view of this, dew point temperature data corresponding to the amounts of gas used is stored in the storage means 13c, and this data can be used to estimate the current dew point temperature T4 of the mixed gas f2 present in the antechamber 9 from the amounts of the gases.

Therefore, the minimum temperature (the minimum antechamber temperature) is found as the temperature that is higher between the minimum partial-oxidation temperature T1 based on the type of first reforming catalyst c1a, and the dew point temperature T4 of the mixed gas f2 estimated from the composition of the mixed gas f2 presumed to be present in the antechamber.

Maximum Temperature

The self-ignition temperature T3 of the mixed gas f2 present in the antechamber 9 depends on the composition of the mixed gas f2 in the antechamber 9 and on its residence time in the antechamber 9 (this "residence time" is the time from when the gas exits the mixing chamber 8 until it reaches the inlet 5a of the catalytic reaction chamber 5, after the mixing of the oxygen o in the mixing chamber 8, and in the present application, this refers to the advection time required for the mixed gas f2 to move through the tubes on the exit side of the mixing chamber 8 up to the inlet 5a of the catalytic reaction chamber 5).

Figure 4:
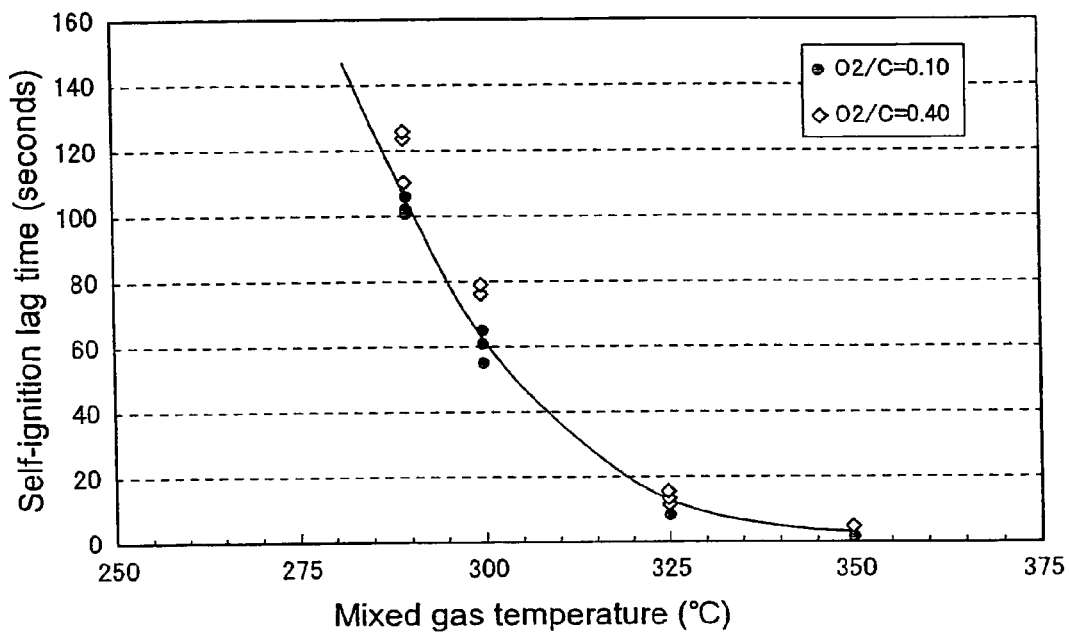
FIG. 4 illustrates the relationship between the mixed gas temperature and the self-ignition lag time.

In view of this, the self-ignition temperature T3 corresponding to the compositional state of the mixed gas f2 first ignited during the residence time is stored in the storage means 13c, and the maximum temperature can be obtained at this temperature. This relationship between the residence time (labeled "ignition lag time" in the FIG. 4) and the self-ignition temperature T3 (labeled "mixed gas temperature" in FIG. 4) is shown in FIG. 4 for the mixed gas f2. This graph shows a case in which the mixed gas f2 contains a hydrocarbon fuel that is natural gas, and in which $N_2/C$ is 0.6 to 1.0 and $O_2/C$ is 0.1 or 0.4. The pressure of the mixed gas in this state is 4 MPa. The combustion reaction is rate-determined by the frequency of collisions in the mixed gas, and the actual frequency factors depend on the molecular diameter and degree of freedom, but if we let the collision frequency of $H_2O$ be 1, then that of $N_2$ is about 0.7 to 0.8, and in the example shown in FIG. 4, nitrogen gas is introduced instead of steam.

With the control device 13, the temperature setting means 13a, and more specifically, the antechamber mixed gas temperature maintenance means 13b, ensures a good operating state by adjusting the amount of hydrocarbon fuel added, the amount of steam added, the amount of oxygen added, and so forth according to the procedure described above.

The operating state of the hydrogen-containing gas manufacturing apparatus 1 according to the present invention controlled by the control device 13 will now be described.

1. When the mixed gas temperature inside the antechamber 9 is within the maximum antechamber temperature (self-ignition temperature) and the minimum antechamber temperature (the temperature that is higher between the minimum partial-oxidation temperature and the dew point temperature)

In this case, the reaction in the catalytic reaction chamber 5 is presumed to be in a fairly proper state. However, even in a proper state such as this, the state of the catalytic reaction chamber 5 is kept stable, so the temperature of the mixed gas f2 in the antechamber 9 is controlled according to the temperature of the catalytic reaction chamber 5, within the range of the maximum antechamber temperature and minimum antechamber temperature.

Here, if a temperature elevation operation is necessary, this can be accomplished by either increasing the amount of oxygen with the amount of hydrocarbon kept constant, or reducing the amount of steam. Conversely, if a temperature reduction operation is necessary, this can be accomplished by either reducing the amount of oxygen or increasing the amount of steam.

The following is an operating example of this embodiment. In this example, ruthenium (supported percentage of 0.7 wt %) was used as the first catalyst, and nickel (supported percentage of 10 wt %) was used as the second catalyst.

Operating Conditions

Feed gas f1
Composition: 88.4% methane, 7.3% ethane, 3.1% propane, 0.6% n-butane, 0.6% i-butane
Added amount: 678 $Nm^3/hr$ Steam
Added amount: 378 $Nm^3/hr$
Oxygen
Added amount: 157 $Nm^3/hr$
($H_2O/C=0.6$, $O_2/C=0.2$)
Antechamber inlet temperature: higher than 200° C., lower than 300° C.
Self-ignition temperature of mixed gas: 300 to 350° C.
Antechamber residence time of mixed gas: 0.48 sec
Dew point of mixed gas: 196° C.
Catalytic reaction chamber inlet temperature: higher than 200° C., lower than 300° C.
Reaction pressure: 4 MPaG
$SV=40,000\ h^{-1}$
Catalytic reaction chamber volume: 33 $dm^3$ (liters)
Minimum partial-oxidation temperature of first catalyst: 200° C.
Minimum partial-oxidation temperature of second catalyst: 250° C.

Under these conditions, reforming could be performed such that the proportion of hydroacid $H_2$ to carbon CO contained in the produced gas at the catalytic reaction chamber outlet 5c, as the molar ratio $H_2/CO$, was $H_2/CO=2$.

Figure 5:
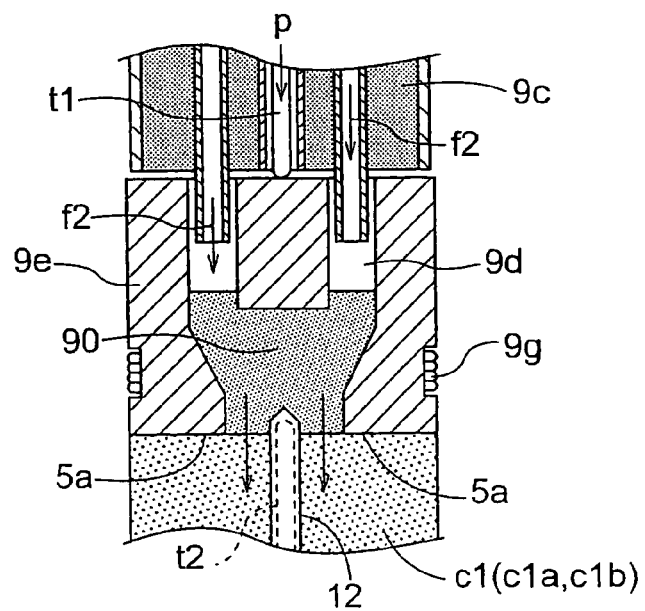
FIG. 5 is a diagram of an example of another configuration of the antechamber.

Variations on the First Embodiment (1) In the above embodiment, a gas channel of substantially the same diameter as the tubes extending from the mixing chamber was provided in the adjusting section of the antechamber, the flow rate of the mixed gas was kept relatively high by means of the tubes and the gas channel, so that the residence time was shorter as the mixed gas was introduced into the catalytic reaction chamber, but as shown in FIG. 5, a merging channel 90 may be provided downstream from the outlet of the tubes, so that the mixed gas f2 flows into the catalytic reaction chamber 5 via this merging channel 90. However, the cross sectional area of this merging channel 90 shall afford a flow rate such that the gas can reach the catalyst layer in a residence time at that site that is less than the self-ignition lag time. When this is done, the mixed gas f2 has more uniform properties, and the mixed gas f2 will spread out well in the direction of the catalytic reaction chamber cross section near the inlet to the catalytic reaction chamber 5.

(2) In the above embodiment, the temperature setting means 13a and the temperature maintenance means 13b were provided to the hydrogen-containing gas manufacturing apparatus, and the amounts of steam and oxygen with respect to the hydrocarbon fuel were proactively controlled to maintain the reaction in the catalyst reaction section in the proper state, but if a normal operating can be substantially maintained anyway, since the flow rates in the chambers 7, 8, and 9 are substantially determined in the reforming unit 11 described above, the channel cross sectional structure may be such that the mixed gas will have the proper temperature in the antechamber 9.

Specifically, the minimum partial-oxidation temperature is determined by the reforming catalyst c1, and if the composition of the mixed gas f2 is determined, then the dew point thereof is also determined, and the minimum antechamber temperature referred to in this application is determined.

Meanwhile, as to the maximum antechamber temperature, the maximum residence time of the mixed gas f2 from the mixing chamber 8 until the catalytic reaction chamber 5 is reached is determined by the shape of the inside of the tubes 8a through which the gas flows, and that of the gas channel 9d of the adjustment section 9b downstream from the tubes 8a. In view of this, the relationship between the mixed gas temperature and its residence time as described above and shown in FIG. 4 is found ahead of time, and the maximum antechamber temperature is set to be the temperature at which the mixed gas f2 does not self-ignite even when the mixed gas f2 has been in the antechamber for the above-mentioned maximum residence time, so that the object of the present invention can be achieved.

(3) In the above embodiment, an example was given in which the temperature of the mixed gas in the antechamber was controlled according to the typical temperature of the catalytic reaction chamber, but basically what is important is that a partial oxidation reaction can occur at the inlet to the catalytic reaction chamber, so the control of the temperature setting means 13a and the temperature maintenance means 13b described above can be constituted so that the temperature of the mixed gas in the antechamber is guided toward the minimum antechamber temperature.

This ensures that the partial oxidation reaction required for reforming will occur.

(4) In the above embodiment, an example was given in which reforming was performed by setting the residence time of the mixed gas in the antechamber, and setting the temperature of the antechamber to a temperature at which the mixed gas would not self-ignite when the mixed gas had been in the antechamber for that residence time, but a means may be provided for proactively preventing the propagation of flame within the antechamber.

Figure 6:
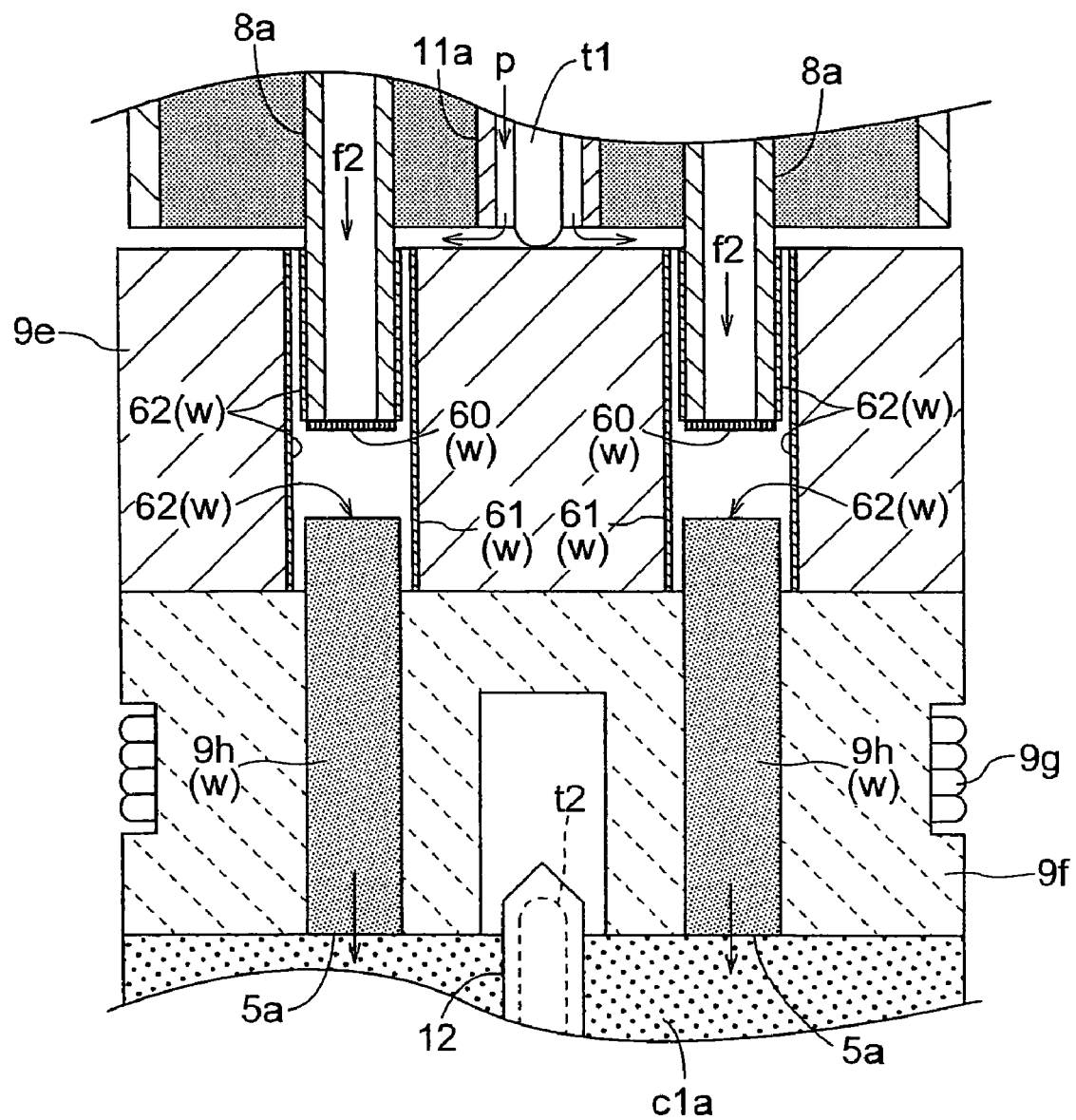
FIG. 6 is a diagram of an example in which a flame propagation suppression means is provided to the antechamber configuration corresponding to FIG. 2.

FIG. 6 shows an example of this, in which a flame arrestor 60 is disposed at the distal end of the tubes 8a, and the inner walls 61 of the gas channel 9d and the sites 62 where stagnation occurs are subjected to a gold coating treatment w to prevent flame propagation. This is another way to prevent flame formation and propagation in the antechamber 9.

Second Embodiment

Figure 7:
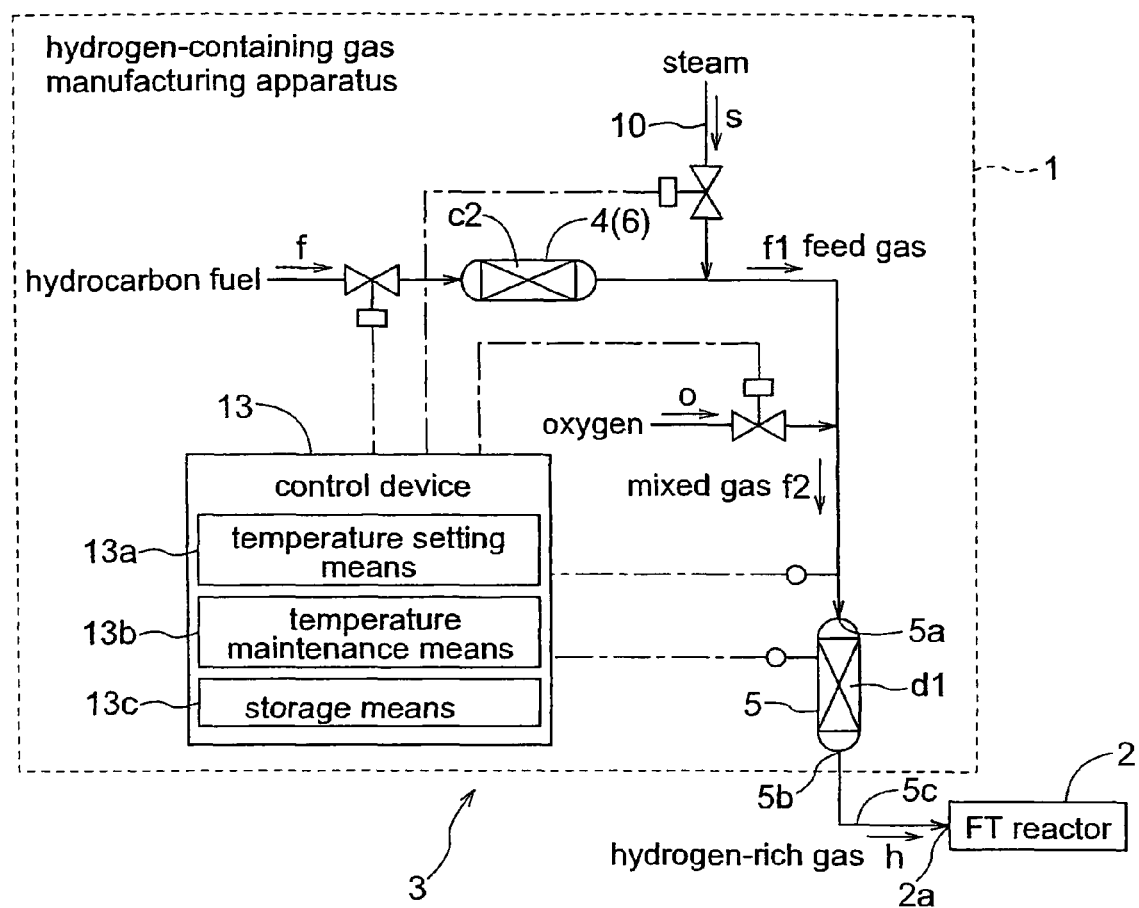
FIG. 7 is a diagram of the configuration of a GTL manufacturing process equipped with the hydrogen-containing gas manufacturing apparatus of a second embodiment according to the present invention.
Figure 8:
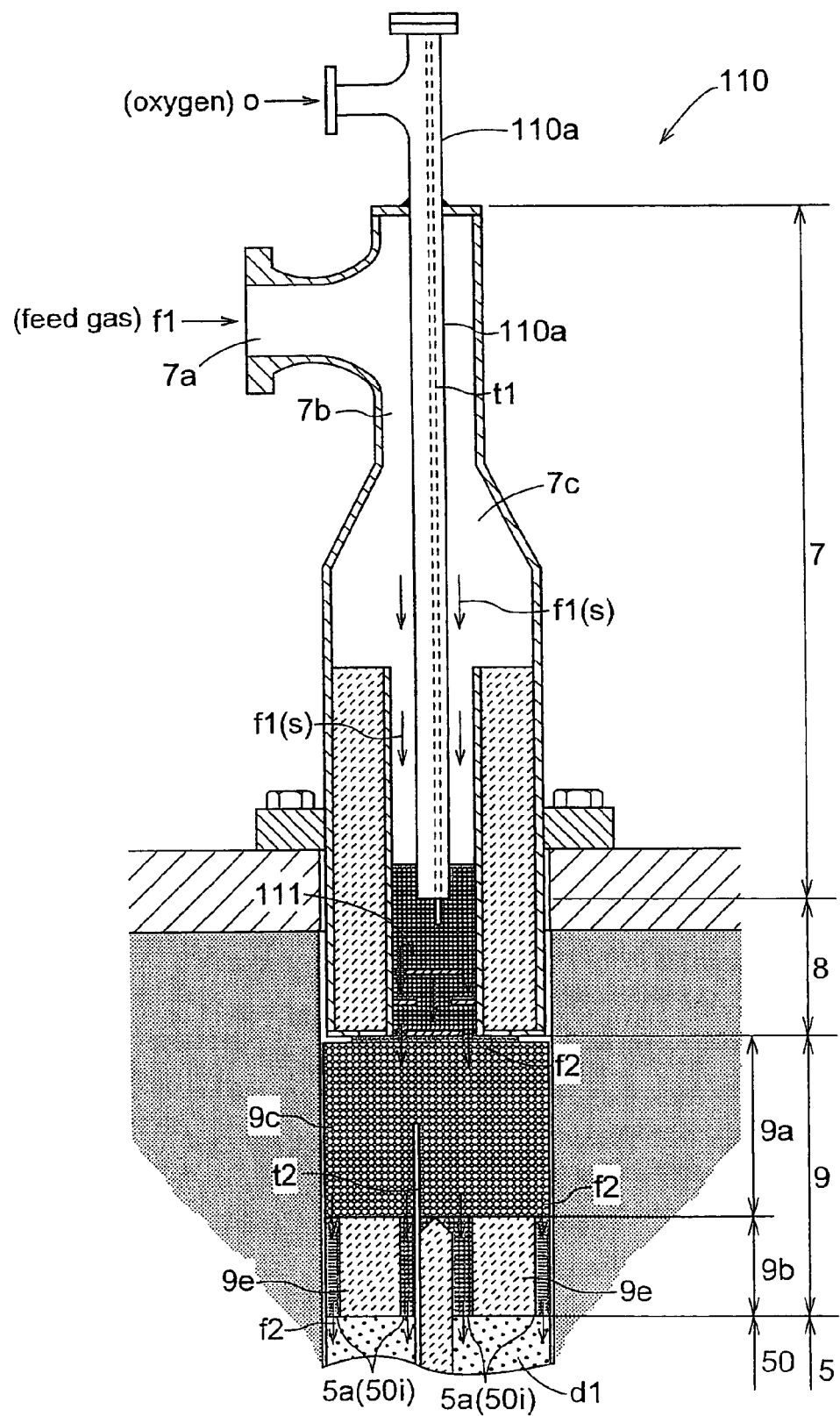
FIG. 8 is a simplified diagram of the configuration of the upper part of the reforming unit in the second embodiment.
Figure 9:
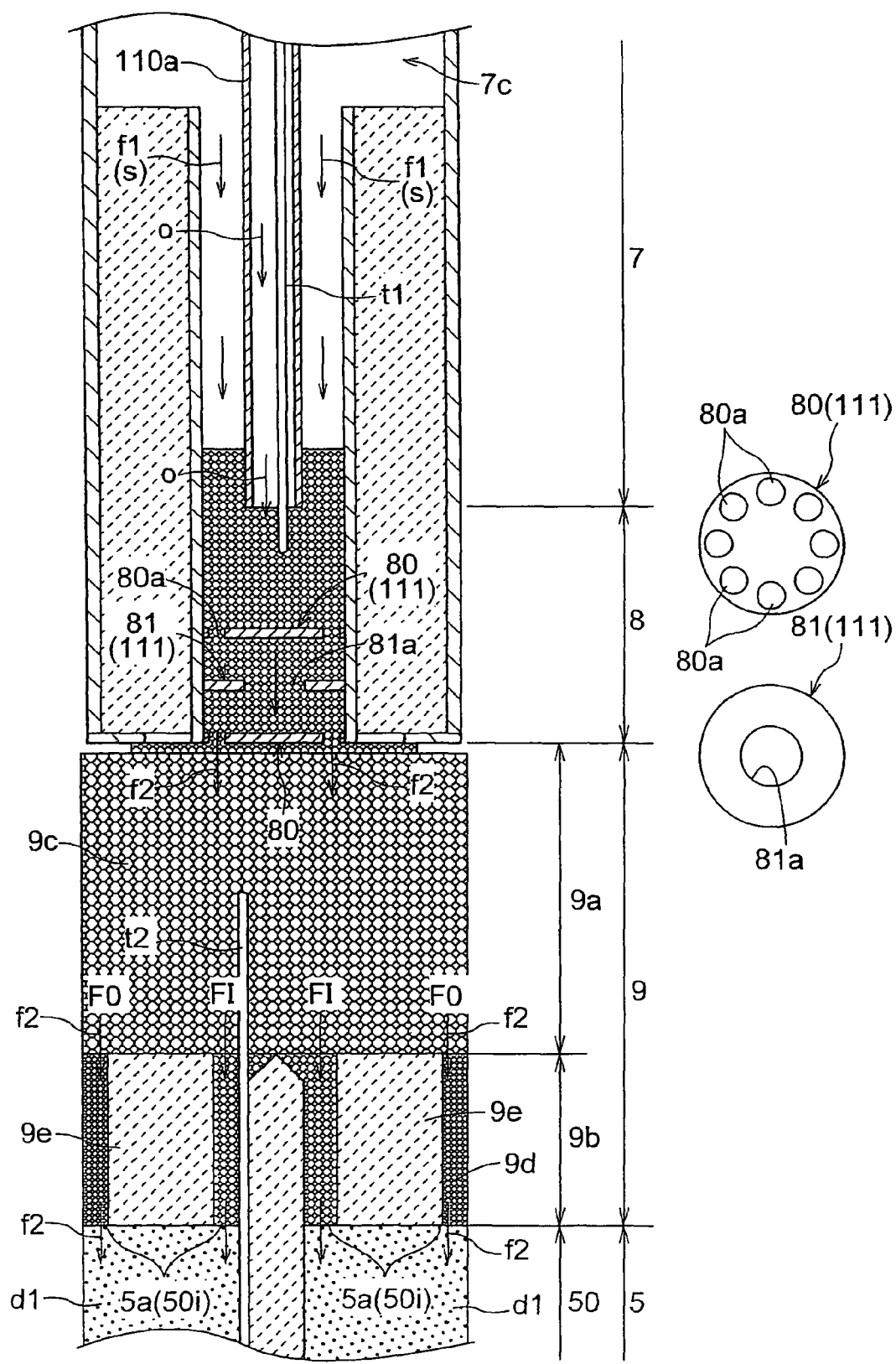
FIG. 9 is a detailed diagram of the site of the inlet to the reforming unit in the second embodiment.
Figure 10:
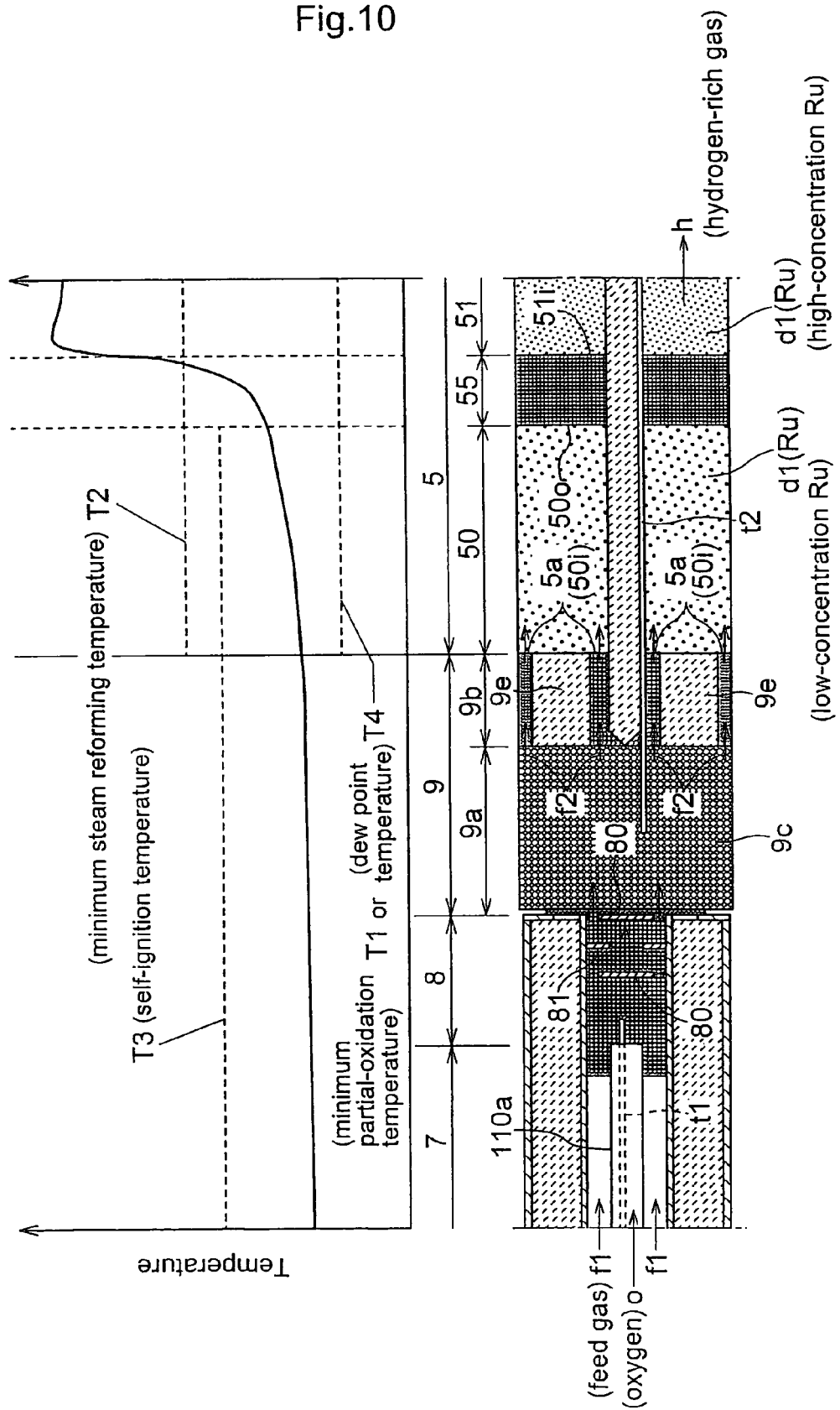
FIG. 10 illustrates the relationship between the temperature at the inlet of the catalytic reaction chamber and the temperature inside the catalytic reaction chamber in the second embodiment.

FIG. 7 illustrates the overall structure of the hydrogen-containing gas manufacturing apparatus 1 of this embodiment, FIGS. 8 and 9 are diagrams corresponding to FIG. 2 of the first embodiment given above, and FIG. 10 is a diagram corresponding to FIG. 3.

As can be seen from FIG. 7, no purging gas p is used in the reforming unit 5 in this example. On the other hand, the steps of desulfurization, steam addition, oxygen mixing, and reforming of the hydrocarbon fuel f as described in the first embodiment remain basically unchanged.

The above-mentioned desulfurization is carried out in the desulfurization chamber 6, and involves lowering the sulfur compound concentration to 1 ppb or less. The steam s is mixed with the hydrocarbon fuel f sent out of the desulfurization chamber 6 to produce the feed gas f1. The amount of steam s with respect to the hydrocarbon fuel f is such that the proportion of steam $H_2O$ to carbon C contained in the fuel (the molar ratio $H_2O/C$) is 0.1 to 3.0 (and preferably 0.1 to 1.0). The temperature at this site is about 200 to 400° C. (and preferably 200 to 300° C.).

FIGS. 8 and 9 show the specific structure of the feed gas chamber 7, the mixing chamber 8, the antechamber 9, and the catalytic reaction chamber 5 of this apparatus 1. This embodiment is characterized by the configuration of the antechamber 9 and the catalytic reaction chamber 5 and by how these are used, so the drawings only show the upper side of the catalytic reaction chamber 5. The exit side provided on the lower side of the catalytic reaction chamber 5 is connected by the connector pipe 5c and via an outlet 5b to the hydrogen introduction port 2a of the FT synthesis reactor 2.

As shown in FIG. 8, the reforming unit 110 in this example has a single-nozzle structure that generates no circulating flow, a baffle 111 is provided to a premixing zone, and the oxygen o and feed gas f1 can be quickly and uniformly mixed.

Reforming Unit 110

As shown in FIG. 9, the reforming unit 110 comprises the feed gas chamber 7, the mixing chamber 8, and the antechamber 9 on the upper side of the unit, and the catalytic reaction chamber 5 is provided on the lower side. The upper side of the reforming unit 110 has a sort of double-cylinder structure, allowing the oxygen o to be supplied through the inner pipe 110a to the mixing chamber 8 and the antechamber 9. As shown in FIG. 9, thermocouples t1 and t2 for temperature measurement are disposed at the lower part of the inner pipe 110a and the lower part of the feed gas chamber 7, respectively, allows the typical temperature (inlet temperature) of the inner pipe and the antechamber 9 to be measured. The typical temperature measured by these thermocouples t1 and t2 is used during temperature setting and maintenance by the control device 13.

Feed Gas Chamber 7

As shown in FIG. 8, the feed gas chamber 7 comprises an introduction port 7a through which is introduced the feed gas f1 mixed with the steam s, a middle path section 7b into which the introduction port 7a opens, and an expanded channel section 7c whose channel cross section is larger than that of the middle path section 7b. The mixing chamber 8 is provided below this expanded channel section 7c.

Mixing Chamber 8

As shown in FIG. 9, the mixing chamber 8 employs what is known as a single-nozzle baffle type of mixing structure, and is configured so that oxygen o coming through the inner pipe 110a and the feed gas f1 from the expanded channel section 7c hit baffle-style collision plates 80 and 81 provided in the mixing chamber 8, forming a mixed gas f2 that is uniformly mixed. As shown in FIG. 9, the collision plates 80 and 81 are provided a specific distance apart, and the mixed gas f2 repeatedly collides with these and spreads out, resulting in the desired uniform state of mixing. A pair of upper and lower collision plates 80 that sandwich the collision plate 81 in the middle each have a plurality of flow-through holes 80a (eight are shown in the drawing) around the outer periphery, as shown on the right side in FIG. 9. The collision plate 81 disposed in the middle has a flow-through hole 81a in its center.

Here, the amount of oxygen o with respect to the hydrocarbon fuel f is 0.05 to 1.0 (and preferably 0.3 to 0.7) as the proportion of oxygen $O_2$ to carbon C contained in the fuel (the molar ratio $O_2/C$). The temperature at this site is about 200 to 400° C. (and preferably 200 to 300° C.). In this application, the gas obtained in this manner is called the mixed gas f2.

Antechamber 9

The antechamber 9 is provided so as to function as an adjusting chamber with respect to the catalytic reaction chamber 5, and comprises an introduction section 9a equipped with an alumina ball layer 9c for further mixing and adjusting the mixed gas f2 supplied from the mixing chamber 8 as described above, and an adjustment section 9b equipped with a block 9e.

The introduction section 9a suitably adjusts the temperature of the antechamber 9 at this site, further mixes the mixed gas f2 flowing in from the mixing chamber 8 while first expanding the channel, and smoothly introduces the mixed gas f2 in the form of a ring into the catalytic reaction chamber 5. Therefore, as shown in the drawing, the channel of the mixed gas f2 expands in the adjustment section 9b, and the gas flow rate decreases.

As shown in FIG. 9, the result of providing the block 9e to the adjustment section 9b is that the flow into the catalytic reaction chamber 5 becomes a flow in the form of a double cylinder consisting of an inner flow FI and an outer flow FO as it is introduced into the catalytic reaction chamber 5.

With the constitution described up to this point, the channel cross sectional area is set so that the flow rate of the mixed gas f2 in the mixing chamber 8 and the antechamber 9 is higher than the minimum flow rate of the feed gas f1 in the feed gas chamber 7, and the residence time of the mixed gas f2 in this chamber is kept as short as possible.

The role of the block 9e described above is to determine the flow, and it is also intended to prevent heat from the catalytic reaction chamber 5 from propagating upstream, and thereby provide good thermal insulation. Therefore, this block is preferably made of alumina, silicon nitride, or another such ceramic material. In FIG. 9, small-diameter alumina balls are disposed around the outer periphery of the block 9e to prevent the gas flow rate from decreasing in the gap between the block 9f and the fire-resistant material.

Furthermore, in the example shown in the drawings, alumina balls are also disposed in the gas channel 9d of the adjustment section 9b, which provides thermal insulation at the boundary between the catalytic reaction chamber 5 and the antechamber 9 and also prevents back-flow of the mixed and unreacted gas.

Catalytic Reaction Chamber 5

The catalytic reaction chamber 5 is the most important part of the hydrogen-containing gas manufacturing apparatus 1 according to the present invention, and is where the reforming catalyst d1 is disposed. Again in this example, the catalytic reaction chamber 5 employs a unique constitution with regard to the distribution and selection of the type of reforming catalyst disposed in its interior. This distribution state will be described through reference to FIG. 10.

FIG. 10 shows a graph, with the direction of flow of gas (the mixed gas flows from left to right) on the horizontal axis, and the temperature on the vertical axis. This graph at the top of FIG. 10 indicates the temperature of the mixed gas with a solid line, based on the temperature axis on the left side, and also indicates the minimum partial-oxidation temperature T1, minimum steam reforming temperature T2, the self-ignition temperature T3, and the dew point temperature T4 with broken lines in the lateral direction.

As shown in FIG. 10, the catalytic reaction chamber 5 comprises, from the inlet 5a side, a first catalyst section 50 in which is disposed at a low concentration a third reforming catalyst d1, which has good low-temperature oxidation activity and also has good reforming activity, a heat blocking layer 55 which is provided on the downstream side of the first catalyst section 50 and in which alumina balls are disposed, and a second catalyst section 51 in which the third reforming catalyst d1 is disposed at a higher concentration than in the first catalyst section 50. The third reforming catalyst d1 here is a ruthenium-based catalyst as shown in FIG. 10. In the following description, the catalyst disposed at a low concentration in the first catalyst section 50 will be called the "first reforming catalyst," while the catalyst disposed at a higher concentration in the second catalyst section 51 will be called the "second reforming catalyst."

The supported percentage of the first reforming catalyst is 0.014 wt %, and the supported percentage of the second reforming catalyst is 0.7 to 3 wt %. The catalyst concentration (amount of catalyst per unit of volume) of the first catalyst section 50 is lower than that of the second catalyst section 51.

The distribution in the direction of flow of the first catalyst section 50 and the second catalyst section 51 will now be described further. In a normal operating state, the positional (position in the flow direction) relationship is determined so that the temperature at the first catalyst section outlet 50o will be no higher than the self-ignition temperature and at least the temperature at which the second catalyst begins partial oxidation.

The total gas flow supplied to the catalytic reaction chamber 5 is such that the gas spatial velocity (calculated for a standard state) per hour, using the amount of first catalyst+ second catalyst as a reference, is 750 to 300,000 $h^{-1}$, and preferably 10,000 to 300,000 $h^{-1}$, and more preferably 50,000 to 300,000 $h^{-1}$.

There are no particular restrictions on the pressure during the reactions, and the reaction pressure can be varied according to the application. When [the present invention] is used in applications for GTL or other such liquid fuel synthesis, a pressure of about 2 to 7 MPa is used. When it is used in applications for the manufacture of hydrogen for fuel cells, on the other hand, the pressure is usually close to normal pressure (such as 1 MPa or lower).

As will be described below, the effect of employing a catalytic reaction chamber with a structure such as this is that the temperature can be steadily raised while the partial oxidation reaction is being conducted in the first catalyst section 50, and the first catalyst section outlet temperature T50o can be controlled to no higher than the self-ignition temperature and at least the temperature at which partial oxidation begins in the second catalyst section 51.

Meanwhile, with the second catalyst section 51, partial oxidation begins near the inlet, the temperature rises a specific amount and reaches the temperature at which the steam reforming reaction will substantially proceed near this inlet, and then reaches the peak temperature.

Specifically, the temperature distribution near the first catalyst section outlet 50o and the second catalyst section inlet 51i (near the downstream side of the flow) is such that the temperature is higher as the gas moves farther downstream, as shown in FIG. 10. However, the presence of the heat blocking layer provided between the first catalyst section 50 and the second catalyst section 51 limits heat transfer from the second catalyst section inlet 51i side to the first catalyst section outlet 50o side, and merely by providing the heat blocking layer 55 that is a thin layer in the flow direction, the temperature of the first catalyst section 50 can be maintained at or below the self-ignition temperature, and partial oxidation by the catalyst at the second catalyst section inlet 51i and, in turn, steam reforming can be carried out effectively.

Catalytic Reaction Chamber

Experiment Related to Second Embodiment

The results of simulation experiments conducted by the inventors will now be described through reference to FIGS. 11 and 12.

In these simulation experiments, the inventors readied experimental equipment that simulated the catalytic reaction chamber 5 equipped with the first catalyst section 50, the heat blocking layer 55, and the second catalyst section 51 of the second embodiment given above, as well as experimental equipment equipped with no heat blocking layer 55, and with the second catalyst section 51 provided on the downstream side of the first catalyst section 50. In FIGS. 11 and 12, the horizontal axis is the distance from the catalytic reaction chamber inlet, and the vertical axis is the temperature. In these graphs, the first catalyst section 50, the heat blocking layer 55, and the second catalyst section 51 are differentiated schematically beneath each graph.

The conditions of these experiments are summarized below in outline form.

Feed gas f1
  Composition: 88.5% methane, 7.2% ethane, 3.1% propane, 0.6% n-butane, 0.6% i-butane
  Added amount: 16.03 dm$^3$ (liters)/min
Steam
  Added amount: 1154 dm$^3$ (liters)/min
Oxygen
  Added amount: 3.85 dm$^3$ (liters)/min
  ($H_2O/C=0.6$, $O_2/C=0.2$)
Antechamber inlet temperature: higher than 200° C., lower than 300° C.
Self-ignition temperature of mixed gas: 300 to 350° C.
Dew point of mixed gas: 122° C.
Catalytic reaction chamber inlet temperature: higher than 200° C., lower than 300° C.
Reaction pressure: 0.5 to 0.52 MPa (5.1 to 5.3 kg/cm$^3$)
SV (first catalyst section)=20,000 h$^{-1}$
First catalytic reaction chamber volume: 0.1 dm$^3$ (liters)
SV (second catalyst section)=100,000 h$^{-1}$
Second catalytic reaction chamber volume: 0.02 dm$^3$ (liters)
Minimum partial-oxidation temperature of first catalyst: 200° C.
Minimum partial-oxidation temperature of second catalyst: 200° C.

The apparatus was operated under these conditions with the supported percentage of the first catalyst at 0.014 wt % and the supported percentage of the second catalyst at 0.7 wt %, whereupon the amount of hydrogen, which was substantially 0 wt % at the catalytic reaction chamber inlet, could be raised to 40 wt % at the reaction chamber outlet by the reforming reaction.

Catalyst Concentration of First Catalyst Component 50

Figure 11:
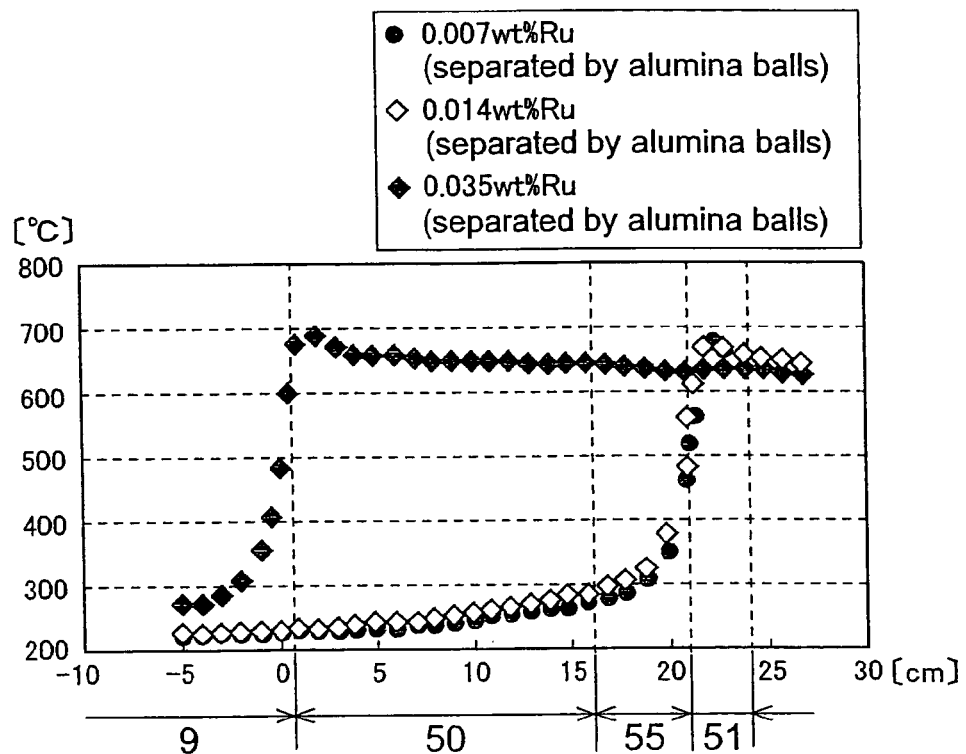
FIG. 11 is a graph of the temperature distribution and the catalyst concentration in the first catalyst section.
Figure 12:
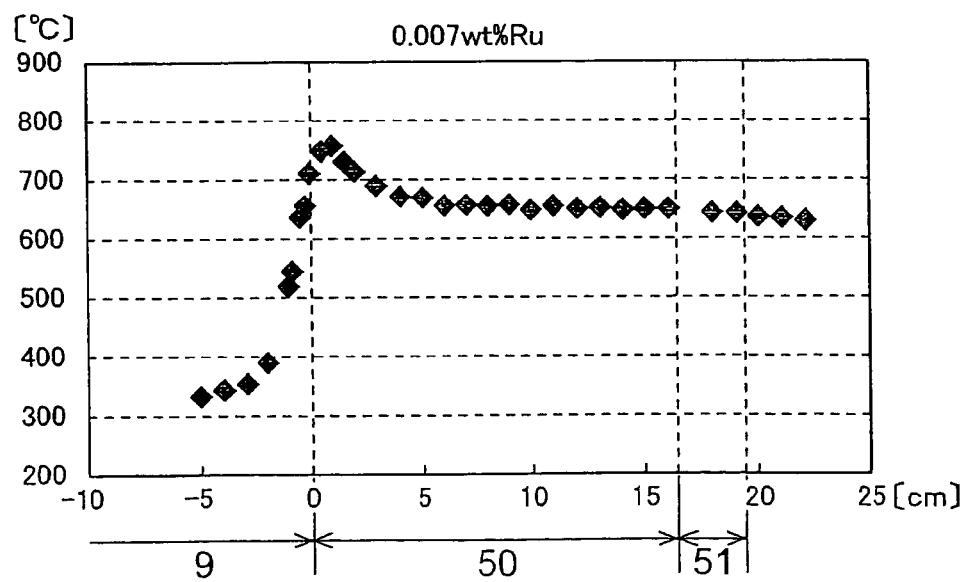
FIG. 12 is a graph of experiment results when no heat blocking layer was provided.

FIG. 11 shows the temperature distribution when the same catalytic reaction chamber structure as in the second embodiment was employed, and when the supported percentage of the first reforming catalyst was varied.

In FIG. 11, different supported percentages of the first reforming catalyst disposed in the first catalyst section 50 were used, and the differences are shown to the right of the graph.

The supported percentage of the ruthenium catalyst (as the supported percentage of the first reforming catalyst) was varied between 0.007 wt %, 0.014 wt %, and 0.035 wt %. Alumina balls were provided for the heat blocking layer 55, and the supported percentage of the ruthenium catalyst at the second catalyst section was 0.7 wt %. In this example, material with the above-mentioned supported percentages was placed at 100% of the site.

As is clear from FIG. 11, in the two examples in which the concentration (supported percentage) of catalyst in the first catalyst section was on the lower side, a low-temperature state at or below the self-ignition temperature was maintained up to the first catalyst section outlet 50o, the temperature rose sharply near the second catalyst section inlet 51i, and the peak temperature appeared near the downstream side of the second catalyst section inlet 51i. Therefore, the temperature distribution that is the goal with the present invention can be favorably attained.

Further, the result on the higher concentration side was such that the temperature of the first catalyst section outlet 50o was higher with respect to the result on the lower concentration side, and it can be seen that the partial oxidation reaction produced by the first catalyst section 50 can be utilized favorably by suitably selecting the catalyst concentration. The reaction gas composition was examined when the ruthenium concentration was set at 0.014 wt %, and was also examined on the side 10 cm in from the first catalyst section inlet 50i, which revealed that the $H_2$ and $CO_2$ concentrations had increased at this position, while the $O_2$ and $CH_4$ concentration had decreased. Thus, this slight increase in temperature seems to have a significant effect.

As a result, it can be seen that suitable selection of the catalyst concentration allows the partial oxidation reaction generated in the first catalyst section 50 to be utilized favorably.

Meanwhile, the example with the highest concentration is one in which the peak temperature occurs near the inlet to the first catalyst section, and this is undesirable.

The inventors also conducted experiments in which alumina balls having no catalytic activity were disposed in the first catalyst section 50, but the result was close to that when the ruthenium concentration was 0.007 wt %. As a result, it is presumed that when the concentration of the catalyst disposed in the first catalyst section is decreased to this level, the effect of thermal conduction will be more apparent.

Heat Blocking Layer 55

The above-mentioned experiment example illustrated in FIG. 11 is an example of providing the heat blocking layer 55 between the first catalyst section 50 and the second catalyst section 51. FIG. 12, on the other hand, shows the results when the first catalyst section 50 and the second catalyst section 51 are linked without the heat blocking layer 55 being provided, and a catalyst with a ruthenium concentration of 0.007 wt % was disposed in the first catalyst section 50. As is clear from the graph, the peak temperature occurs near the inlet to the first catalyst section, which is undesirable.

Variations on the Second Embodiment (1) In the above embodiment, 100% of catalysts with specific, differing supported percentages were held in the first catalyst section 50 and the second catalyst section 51, and the amount (concentration) of catalyst at these sites was suitably adjusted. However, for the catalyst to be held in each catalyst section, an inert member having no catalytic activity (alumina balls) may be mixed in to adjust the catalyst concentration. Specifically, the catalyst concentration of the first catalyst section 50 is set lower than the catalyst concentration of the second catalyst section 51, so the catalyst concentration at these sites may be set to a suitable state by utilizing catalysts with the same supported percentage and mixing in a suitable amount of alumina balls or the like on the first catalyst section 50 side.

(2) In the above embodiment, the heat blocking layer 55 was provided between the first catalyst section 50 and the second catalyst section 51, but this heat blocking layer 55 does not have to be provided as long as the position of the peak temperature can be kept to the inside near the second catalyst section 51, depending on the flow rate of the gas flowing through the catalytic reaction chamber 5.

Variations Common to the First and Second Embodiments

In the embodiments described so far, steam was added to a hydrocarbon fuel, a partial oxidation reaction was conducted, and then a steam reforming reaction was brought about, but what is known as a carbon dioxide reforming reaction may instead be brought about. This carbon dioxide reforming reaction is also an endothermic reaction, and the reaction proceeds according to Chemical Formula 3 given below.

$C_nH_m + nCO_2 \rightarrow 2nCO + m/2H_2$ (endothermic reaction) [Chemical Formula 3]

Figure 13:
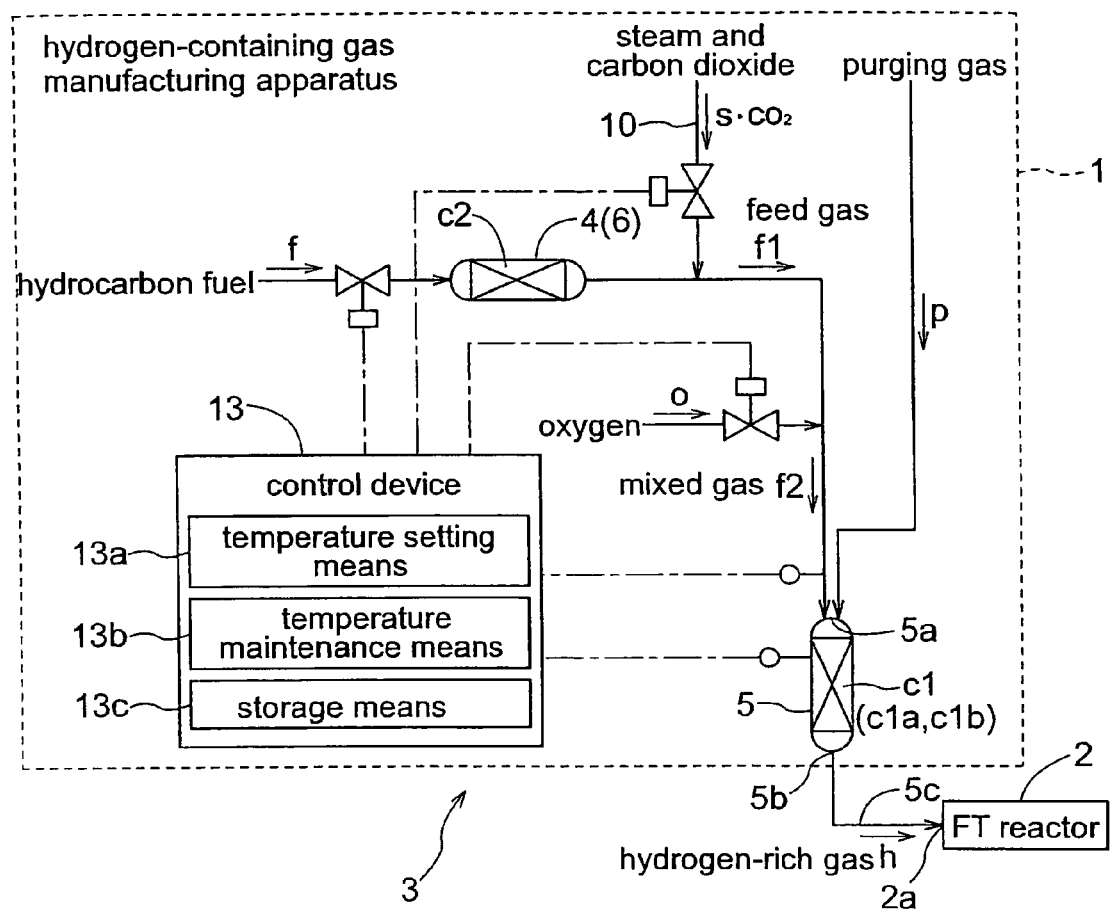
FIG. 13 is a diagram of another embodiment in which carbon dioxide reforming is conducted along with steam reforming.

FIG. 13 corresponds to FIG. 1 and illustrates an example of a GTL manufacturing process in which steam reforming according to Chemical Formula 2 and carbon dioxide reforming according to Chemical Formula 3 are conducted. The equipment is configured the same as what is shown in FIG. 1, but whereas in the example shown in FIG. 1 the feed gas f1 was obtained by adding only the steam s to the hydrocarbon fuel f, in this example the feed gas f1 is obtained by adding the steam s and carbon dioxide ($CO_2$). With this GTL manufacturing process, a steam reforming reaction and a carbon dioxide reforming reaction can both proceed.

Again with this reaction mode, with the method and apparatus for manufacturing a hydrogen-containing gas according to the present invention, the desired good state is obtained in the antechamber and in the subsequent catalytic reaction chamber.

Given a method for manufacturing a hydrogen-containing gas by means of a partial oxidation reaction and a steam reforming reaction, a stable state is obtained in an antechamber provided on the upstream side of a catalytic reaction chamber, and a manufacturing apparatus that makes use of this method is also obtained.

The invention claimed is:

1. A method for manufacturing a hydrogen-containing gas, comprising:
 a mixing step of mixing, in a mixing chamber, an oxygen-containing gas with a feed gas obtained by mixing steam with a hydrocarbon fuel; and
 a reformation step of guiding the mixed gas obtained in the mixing chamber into a catalytic reaction chamber via an antechamber provided on the upstream side of the catalytic reaction chamber and bringing the mixed gas into contact with at least one reforming catalyst and thereby obtaining a hydrogen-containing gas by means of a partial oxidation reaction and a steam reforming reaction,
 wherein the catalytic reaction chamber includes a first catalyst section in which is disposed a first reforming catalyst that has low-temperature oxidation activity and a second catalyst section which is provided on the downstream side of the first catalyst section and in which is disposed a second reforming catalyst that has reforming activity,
 the mixed gas is introduced into the catalytic reaction chamber after the temperature of the antechamber has been set to at least a minimum partial-oxidation temperature and below a self-ignition temperature, where the self-ignition temperature is the temperature at which the mixed gas self-ignites during the advection period required for the mixed gas to move from the mixing chamber to the catalytic reaction chamber, and the minimum partial-oxidation temperature is the minimum temperature at which the first reforming catalyst undergoes the partial oxidation reaction, and
 wherein the first reforming catalyst concentration of the first catalyst section is the concentration at which a first catalyst section outlet temperature is no higher than the self-ignition temperature and is at least the temperature at which the second catalyst undergoes partial oxidation, in a state in which the temperature of the antechamber has been set to at least the minimum partial-oxidation temperature and below the self-ignition temperature.

2. The method for manufacturing a hydrogen-containing gas according to claim 1, further comprising a step of providing a heat blocking layer with lower thermal conduction characteristics than the first catalyst section between the first catalyst section and the second catalyst section.

3. The method for manufacturing a hydrogen-containing gas according to claim 1, further comprising a step of mixing an inert member that has no catalytic activity with the first catalyst section to set the first reforming catalyst concentration of the first catalyst section.

4. The method for manufacturing a hydrogen-containing gas according to claim 1, wherein the first catalyst section outlet temperature is the self-ignition temperature.

5. The method for manufacturing a hydrogen-containing gas according to claim 4, wherein if the temperature that is higher between the minimum partial-oxidation temperature and the dew point temperature of the mixed gas is taken as the minimum antechamber temperature, and the self-ignition temperature is taken as the maximum antechamber temperature, the temperature of the mixed gas flowing through the antechamber is maintained higher than the minimum antechamber temperature and lower than the maximum antechamber temperature.

6. The method for manufacturing a hydrogen-containing gas according to claim 5, wherein the sulfur compound concentration of the hydrocarbon fuel is 1 ppb or less.

7. The method for manufacturing a hydrogen-containing gas according to claim 1, wherein the first reforming catalyst is a reforming catalyst selected from the group consisting of ruthenium, platinum, and combinations thereof, and the second reforming catalyst is a reforming catalyst selected from the group consisting of nickel, rhodium, ruthenium, and combinations thereof.

8. A method for manufacturing a hydrogen-containing gas comprising:
 a mixing step of mixing, in a mixing chamber, an oxygen-containing gas with a feed gas obtained by mixing steam with a hydrocarbon fuel; and
 a reformation step of guiding the mixed gas obtained in the mixing chamber into a catalytic reaction chamber via an antechamber provided on the upstream side of the catalytic reaction chamber and bringing the mixed gas into contact with at least one reforming catalyst and thereby obtaining a hydrogen-containing gas by means of a partial oxidation reaction and a steam reforming reaction,
 wherein the catalytic reaction chamber includes a first catalyst section in which is disposed a ruthenium catalyst and a second catalyst section which is provided on the downstream side of the first catalyst section and in which is disposed a ruthenium catalyst in a state of higher concentration than the first catalyst section,
 the mixed gas is introduced into the catalytic reaction chamber after the temperature of the antechamber has been set to at least a minimum partial-oxidation temperature and below a self-ignition temperature, where the self-ignition temperature is the temperature at which the mixed gas self-ignites during the advection period required for the mixed gas to move from the mixing chamber to the catalytic reaction chamber and the minimum partial-oxidation temperature is the minimum temperature at which the first reforming catalyst undergoes the partial oxidation reaction, and
 the ruthenium concentration of the first catalyst section is set such that the first catalyst section outlet temperature will be at least the temperature at which the second catalyst section undergoes partial oxidation and no higher than the self-ignition temperature in a state in which the temperature of the antechamber has been set to at least the minimum partial-oxidation temperature and below the self-ignition temperature; and a step of providing a heat blocking layer with lower thermal conduction characteristics than the first catalyst section between the first catalyst section and the second catalyst section.

9. The method for manufacturing a hydrogen-containing gas according to claim 8, further comprising a step of mixing an inert member that has no catalytic activity with the first catalyst section to set the ruthenium catalyst concentration of the first catalyst section.

10. The method for manufacturing a hydrogen-containing gas according to claim 8, wherein if the temperature that is higher between the minimum partial-oxidation temperature and the dew point temperature of the mixed gas is taken as the minimum antechamber temperature and the self-ignition temperature is taken as the maximum antechamber temperature, the temperature of the mixed gas flowing through the antechamber is maintained higher than the minimum antechamber temperature and lower than the maximum antechamber temperature.

* * * * *

UNITED STATES PATENT AND TRADEMARK OFFICE
CERTIFICATE OF CORRECTION

PATENT NO. : 8,361,433 B2  Page 1 of 1
APPLICATION NO. : 11/922032
DATED : January 29, 2013
INVENTOR(S) : Noguchi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1447 days.

Signed and Sealed this
First Day of September, 2015

Michelle K. Lee
*Director of the United States Patent and Trademark Office*